Jan. 21, 1964 J. M. COOMBS 3,119,110

DATA STORAGE APPARATUS CONTROLS

Original Filed May 2, 1949 15 Sheets-Sheet 4

Jan. 21, 1964 J. M. COOMBS 3,119,110

DATA STORAGE APPARATUS CONTROLS

Original Filed May 2, 1949 15 Sheets-Sheet 7

INVENTOR.

BY

Jan. 21, 1964 J. M. COOMBS 3,119,110

DATA STORAGE APPARATUS CONTROLS

Original Filed May 2, 1949 15 Sheets-Sheet 9

INVENTOR.

BY

Jan. 21, 1964 J. M. COOMBS 3,119,110

DATA STORAGE APPARATUS CONTROLS

Original Filed May 2, 1949 15 Sheets-Sheet 10

INVENTOR.

BY

Jan. 21, 1964 J. M. COOMBS 3,119,110

DATA STORAGE APPARATUS CONTROLS

Original Filed May 2, 1949 15 Sheets-Sheet 11

INVENTOR.

BY

READING AMPLIFIER – TIMING SIGNALS

VOLTAGE AT READING HEAD

DIFFERENTIATED VOLTAGE

OUTPUT VOLTAGE 3,119,110

DATA STORAGE APPARATUS CONTROLS

John M. Coombs, Poughkeepsie, N.Y., assignor to Sperry Rand Corporation, a corporation of Delaware Original application May 2, 1949, Ser. No. 90,941. Divided and this application Nov. 12, 1954, Ser. No. 468,455
14 Claims. (Cl. 346—74)

The present invention relates to data storage apparatus controls and, more particularly, to means for controlling the drive of such an apparatus as well as means for controlling the transmission of data with respect to the drum, tape or other data storage element of such an apparatus. It will be understood that the transmission of data with respect to such an element involves the recording of data upon the element, alteration, including erasure, of data upon the element, or the reading of data previously recorded upon the element.

This application is a division of my copending application Serial No. 90,941, filed May 2, 1949, and now abandoned.

In various lines of endeavor, for example, computing and recording, it is desirable to store information for a period of time and yet have the information readily available for reading or alteration. Apparatus and systems for this purpose are disclosed in the application of Arnold A. Cohen, William R. Keye and Charles B. Tompkins for Data Storage Systems, Serial No. 16,998, filed March 25, 1948, now Patent No. 2,540,654, and in the application of John M. Coombs and Charles B. Tompkins for Data Storage Apparatus, Serial No. 16,997, filed March 25, 1948, now Patent No. 2,617,705.

Although the present invention may be used with various forms of data storage apparatus, in the embodiment of the invention disclosed herein for purposes of example, the data storage element is a rotary drum having paramagnetic tapes upon its periphery and with a group of magnets positioned adjacent each of the tapes to apply or record data or signals upon the tape, and erase, read or alter such data, all as particularly described in said applications. As is pointed out in said Coombs and Tompkins application, the drum used therein may be rotated at such rate that the drum periphery will have a speed of the order of 400 inches per second, and with a drum thirty-four inches in diameter, the track associated with each magnet may include 5,340 cells or discrete areas to receive signals.

During either reading or erasing of signals the drum of said applications may be continuously rotated at a speed of the order of 220 r.p.m. As is also mentioned in said applications, signals may be altered or recorded during rotation of the drum at the high speed mentioned. However, in the original recording of data upon the drum, it is frequently desirable to move the drum non-continuously, viz., step by step, and in such a way that a cell or discrete data receiving area thereon will be stationary with respect to a recording magnet for the brief interval of time required for recording. In addition, it will be desirable to have all data start, or be located at a predetermined position with respect to a given point circumferentially of the drum and the magnets or other data transmitting members. Therefore, it is desirable to include controls to bring that starting or homing point of the drum into proper position with respect to the magnets. It is desirable to rotate the drum at somewhat lower speed to bring or "home" the drum to such starting point.

An object of the present invention is to provide a driving and control means for a movable data storage element, or other movable element, including arrangements to continuously move the element at high speed or low speed, or to move it intermittently or step by step.

A further object of the invention is to provide control means whereby the driving means for a data storage element or other movable element will be operative to provide either continuous or step by step movement.

Still another object of the invention is to provide control means whereby a data storage element can be moved to a predetermined position and then slowly moved, for example, step by step, to finally bring it to the exact position desired.

Still another object of the invention is to provide control means for a movable data storage element whereby step by step movement of the element during a recording operation will be synchronized with and controlled by the application of data to the element.

Other objects and advantages of the invention will be apparent from the following specification and accompanying drawings, in which drawings:

FIGURE 5 is also an enlarged view of mechanism partially shown at the bottom of FIGURE 2.

Figure 12:
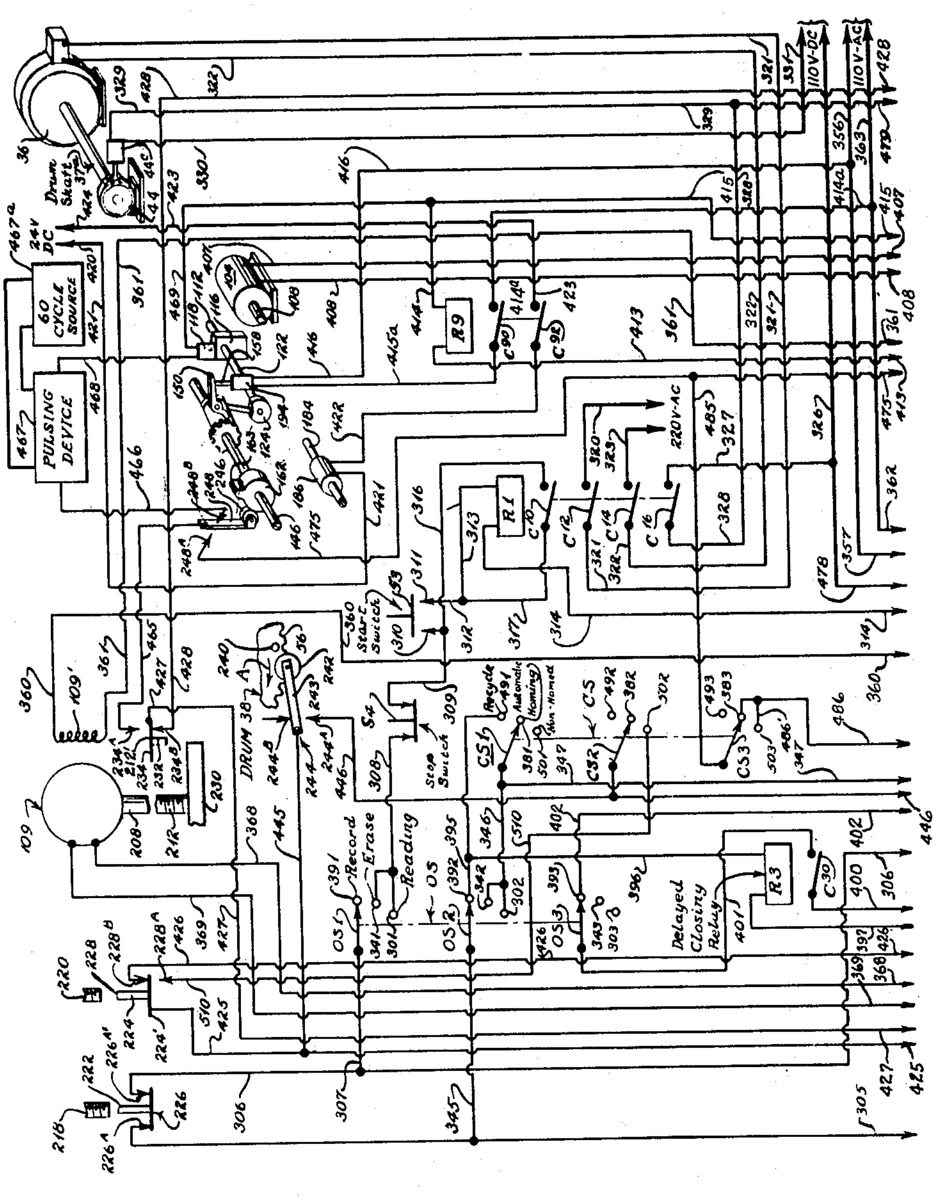
Figure 13:
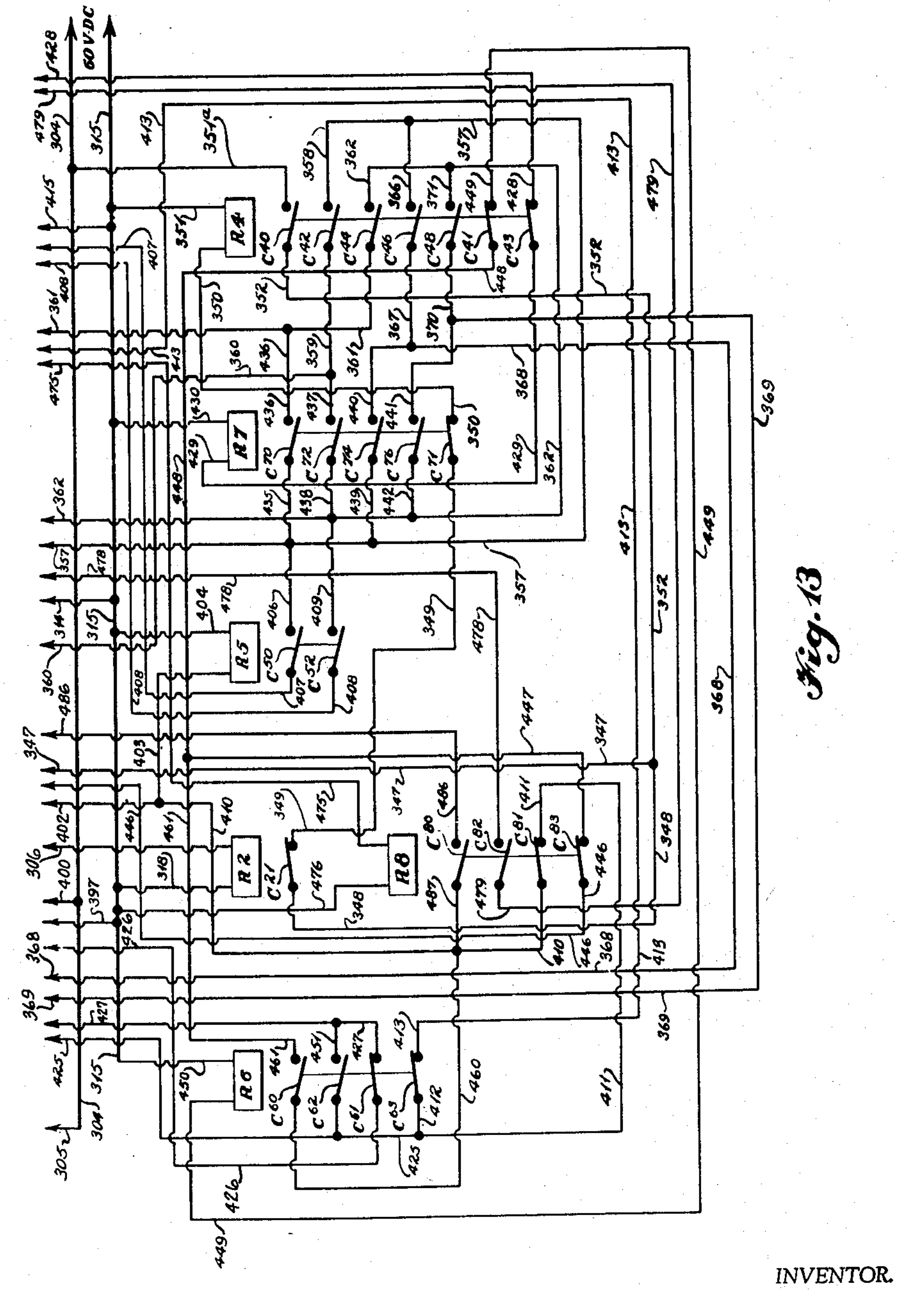

FIGURES 12 and 13, together, diagrammatically illustrate drive controlling circuits for the data storage element.

Figure 14:
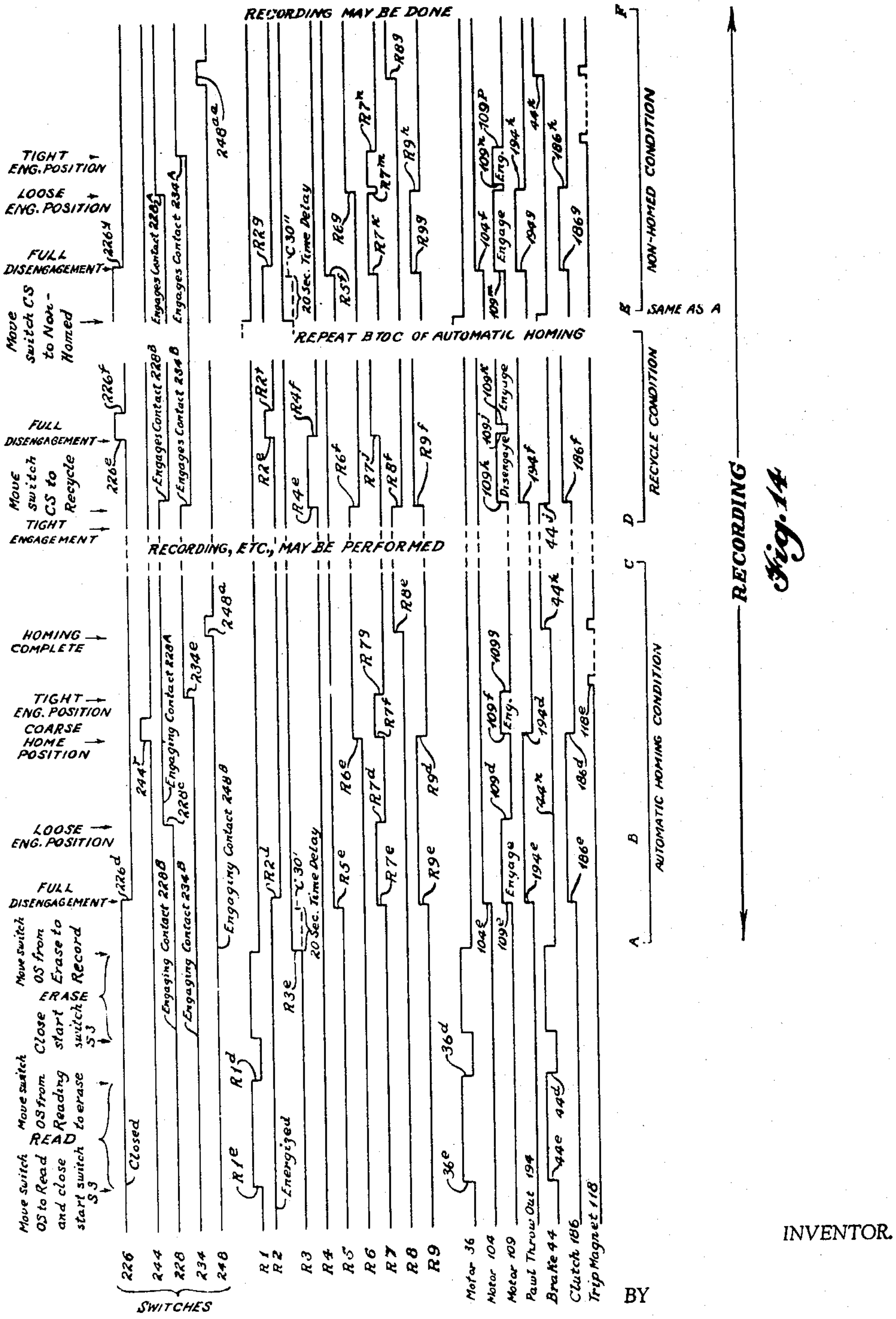

FIGURE 14 is a chart indicating the sequence of operation of the various elements of the circuits of FIGURES 12 and 13.

Figures 15, 16:
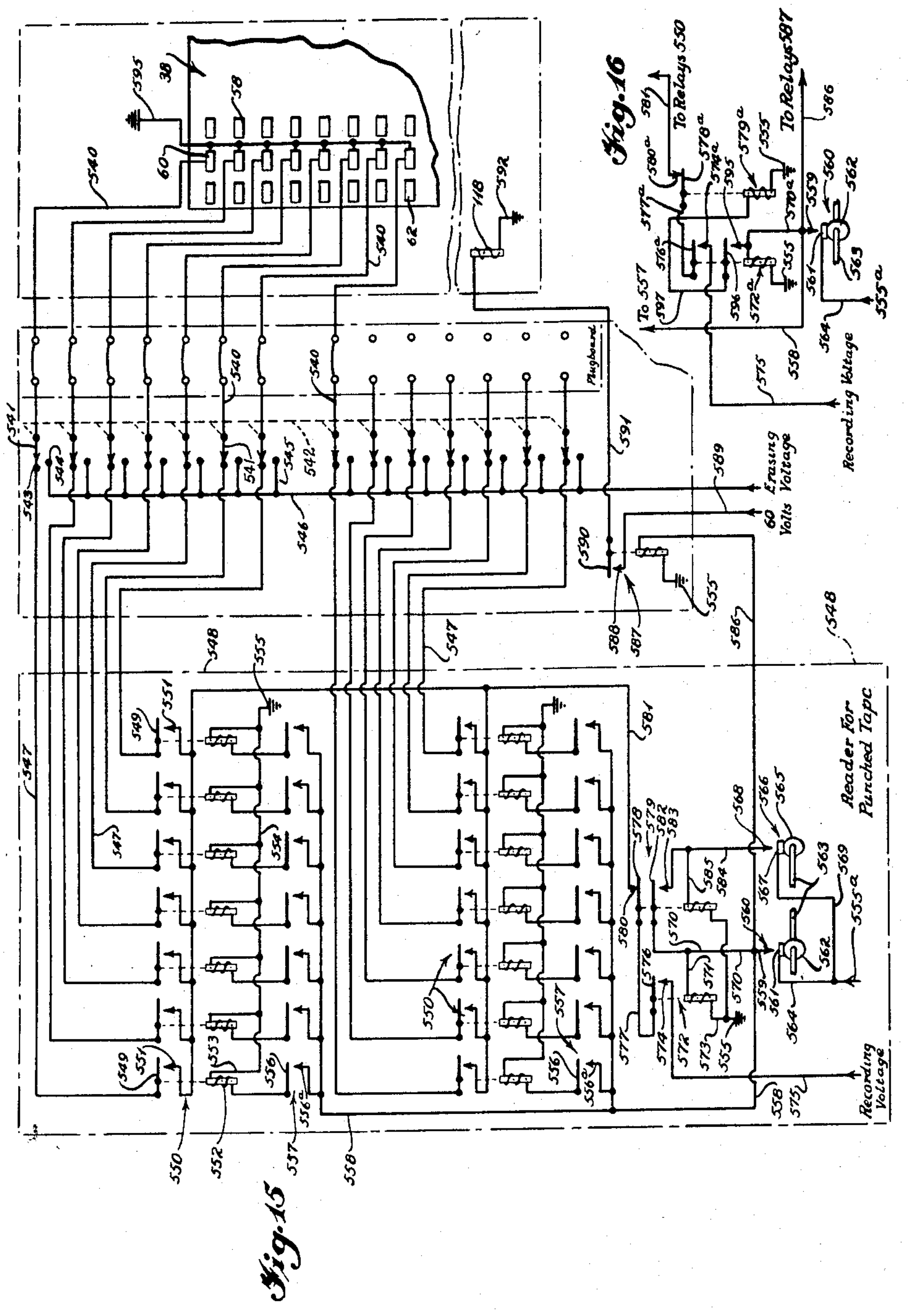

FIGURE 15 is a diagrammatic showing of the circuits used during recording and erasing data upon the data storage element.

FIGURE 16 illustrates a modification of the FIGURE 15 circuit.

Figure 17:
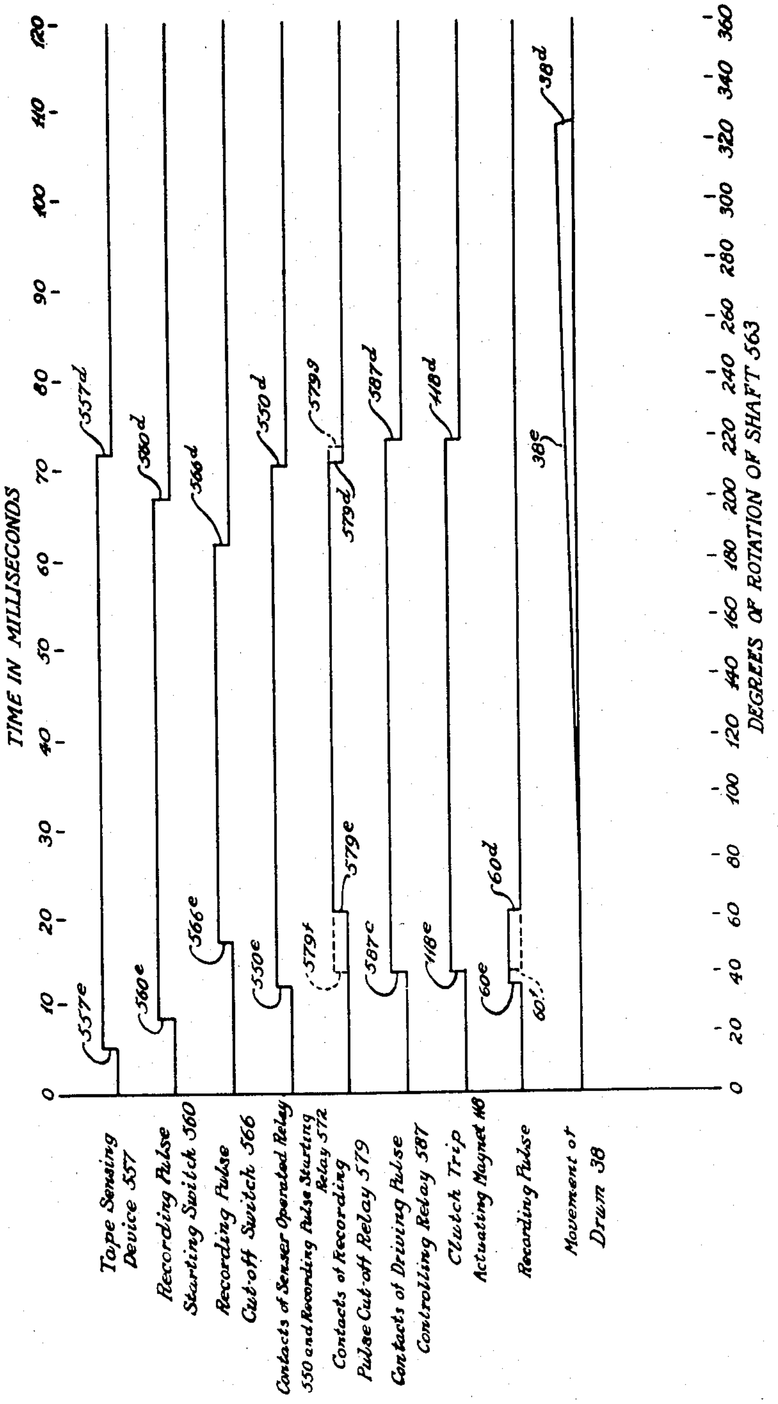

FIGURE 17 charts the sequence of operations during recording with the drum moving step-by-step.

Figure 18:
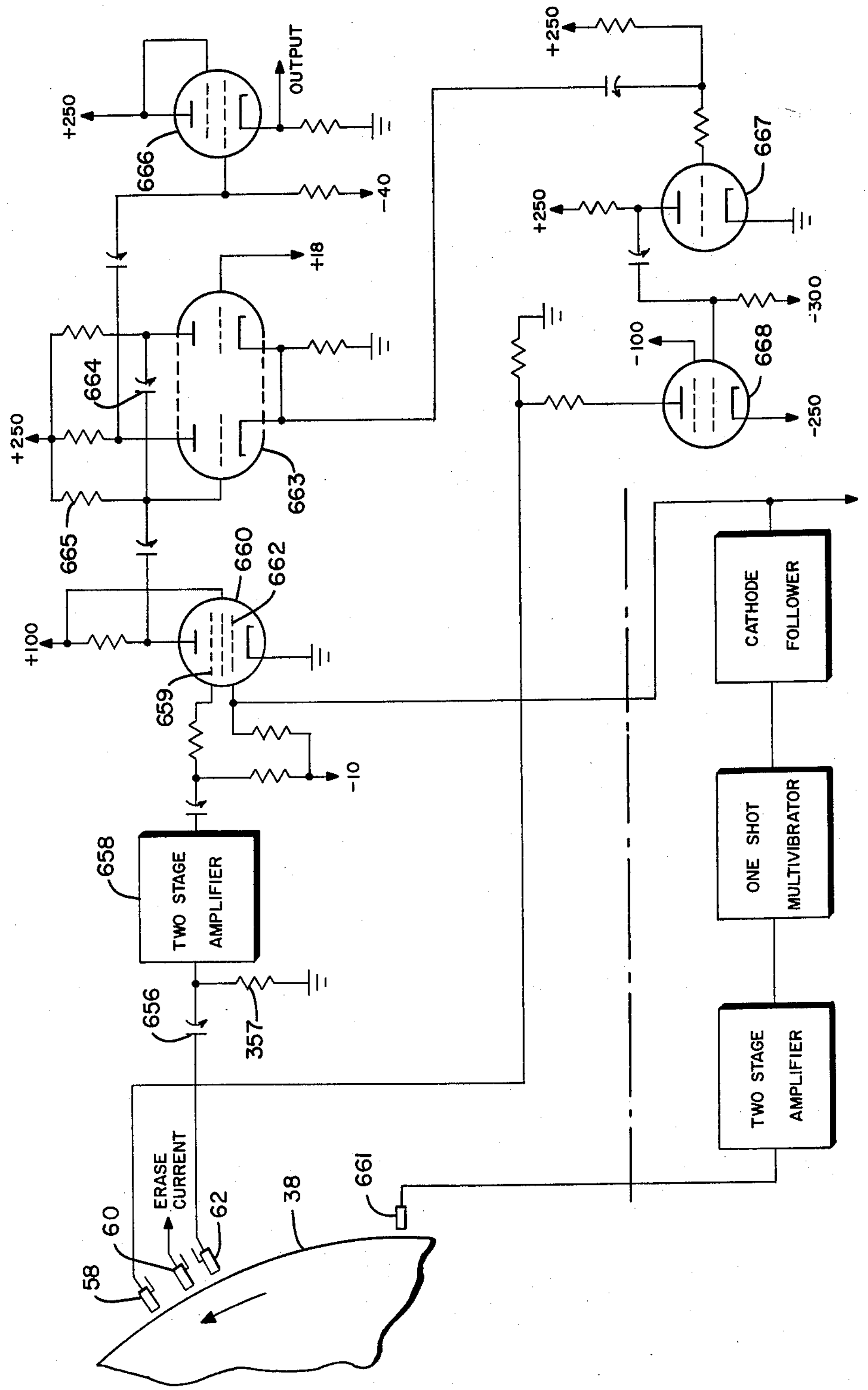
Figure 19:
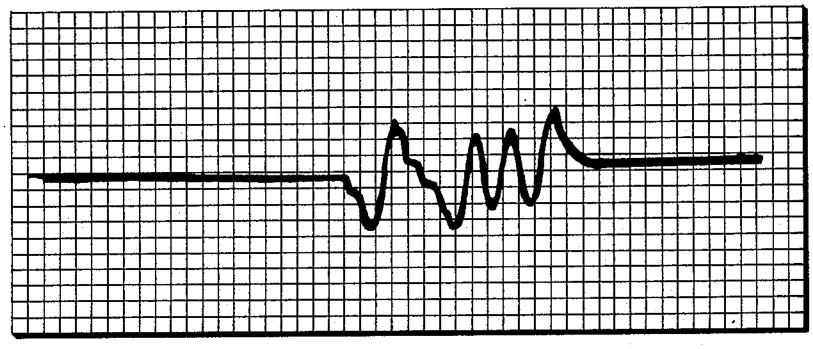
Figure 20:
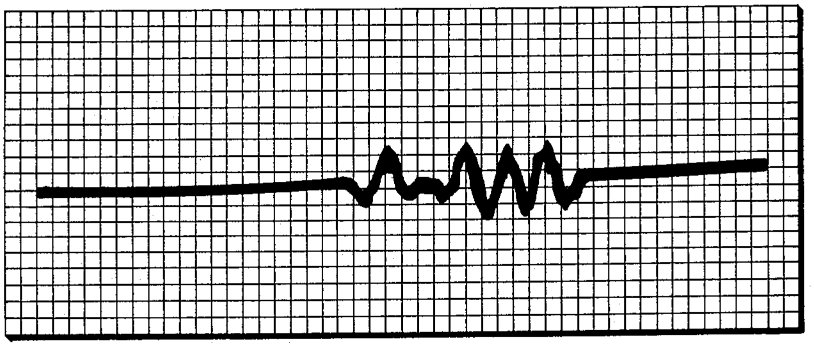
Figure 21:
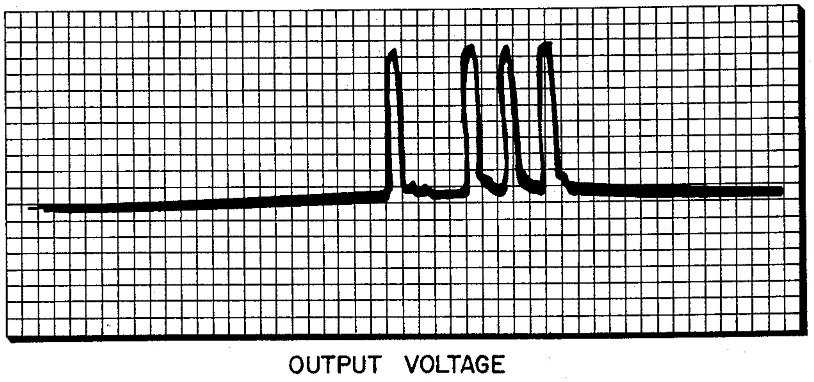

FIGURE 18 is a diagrammatic view showing circuits for use in reading and re-recording information, and FIGURES 19, 20 and 21 show the voltage characteristics of signals obtained at stages in the circuit of FIGURE 18.

Figure 1:
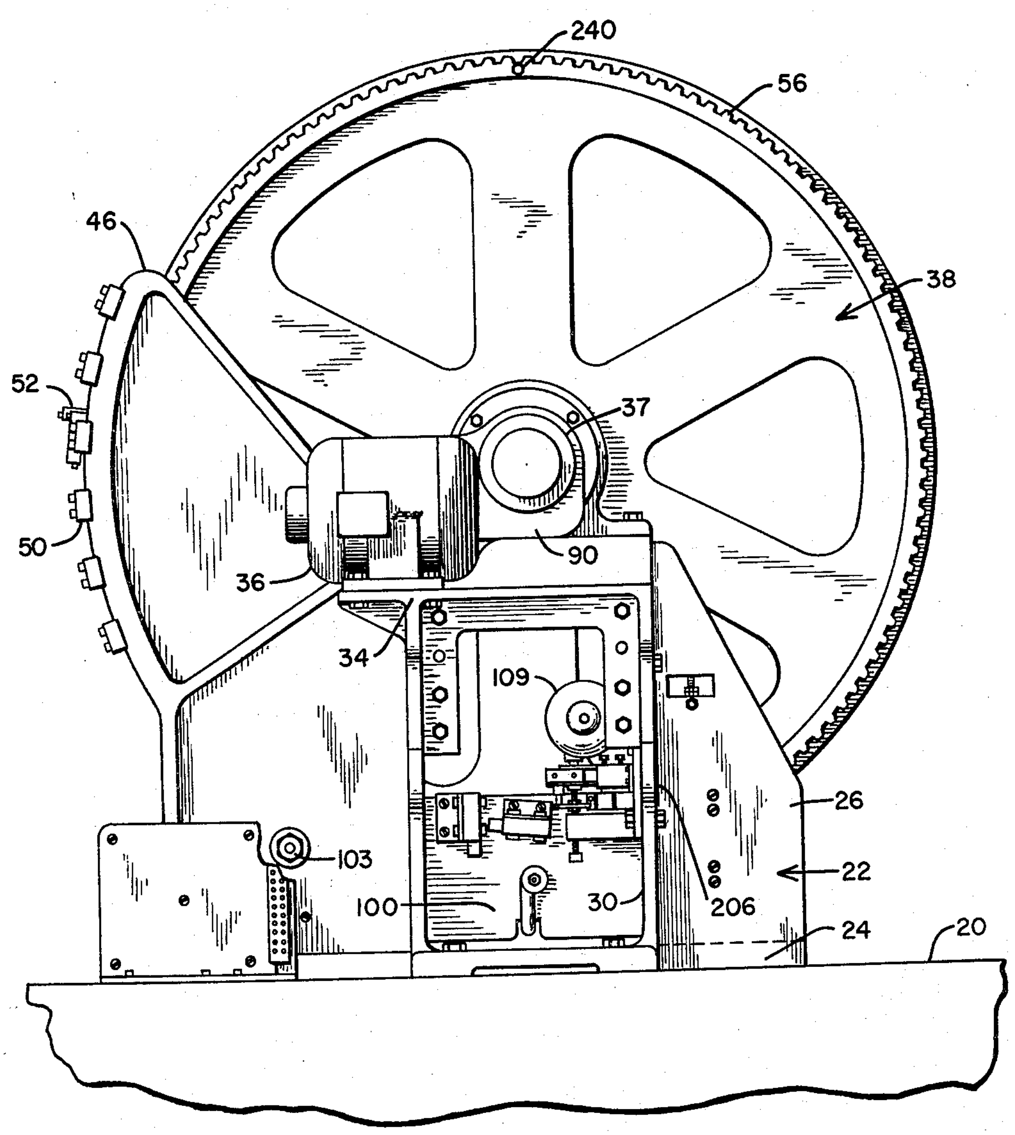
FIGURE 1 is a front elevation of the apparatus of the invention.
Figure 3:
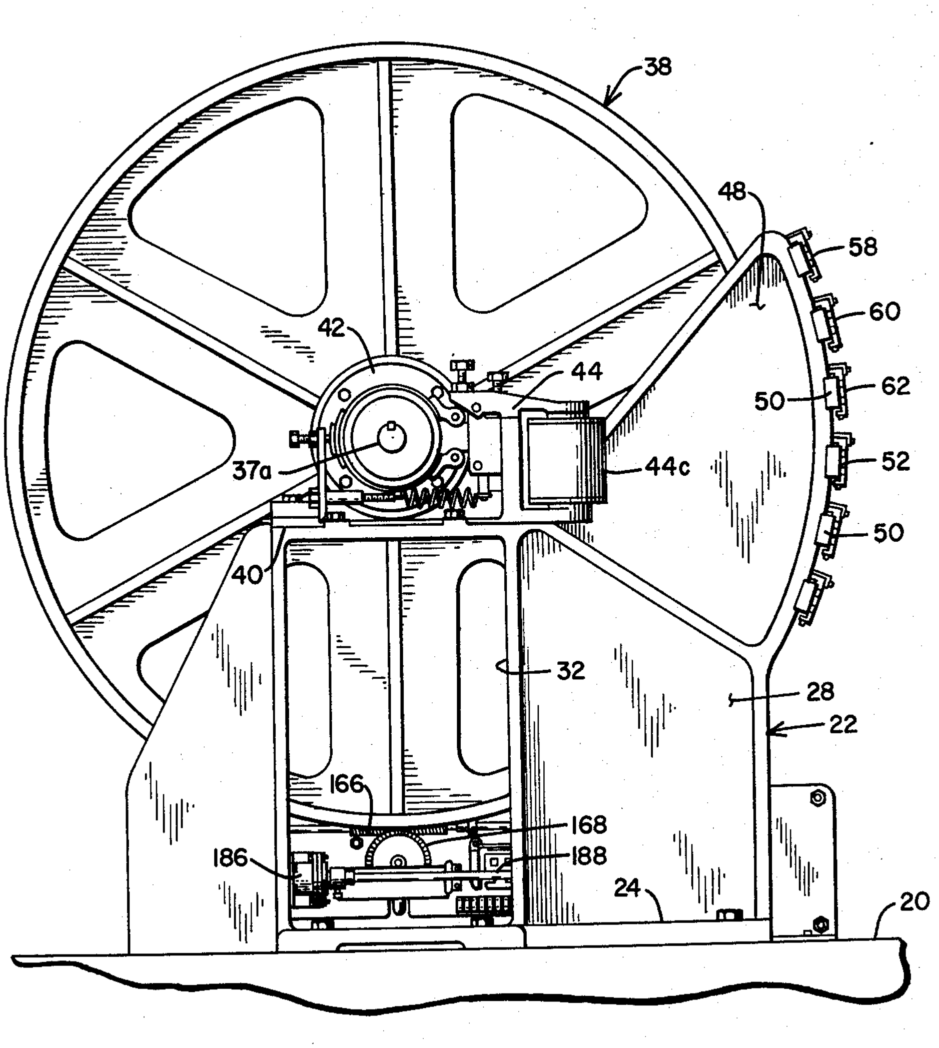
FIGURE 3 is a rear view of the apparatus.

Referring to FIGURE 1, the numeral 20 designates a platform, table or the bottom wall of a cabinet or other support upon which the apparatus would be positioned. The numeral 22 generally designates the stationary frame of the apparatus. Frame 22 includes a lower horizontally extending plate 24 preferably directly secured to the support 20 and also includes front and rear vertically extending frame walls 26 and 28. As is best indicated in FIGURES 1 and 3, the respective front and rear frame walls 26 and 28 may be provided with openings 30 and 32 intermediate their ends. The opening 30 at the top of the front frame wall 26 is bridged by a forwardly extending supporting platform 34 for a motor 36, as well as by a support for the front journal 37 for the shaft 37*a* of data storage drum 38. Similarly, as is shown in FIGURE 3, the opening 32 in the rear frame wall 28 is bridged by a plate 40 which supports the rear journal 42 for the drum shaft 37*a*, as well as a brake 44 hereinafter described. As is best shown in FIGURES 1 and 3, the frame walls 26 and 28 project upwardly at one end thereof as indicated at 46 and 48, respectively. These upwardly projecting portions carry cross bars 50 arranged concentrically with the periphery of drum 38. As is hereinafter described, the cross bars 50 support magnets generally designated 52.

Figure 4:
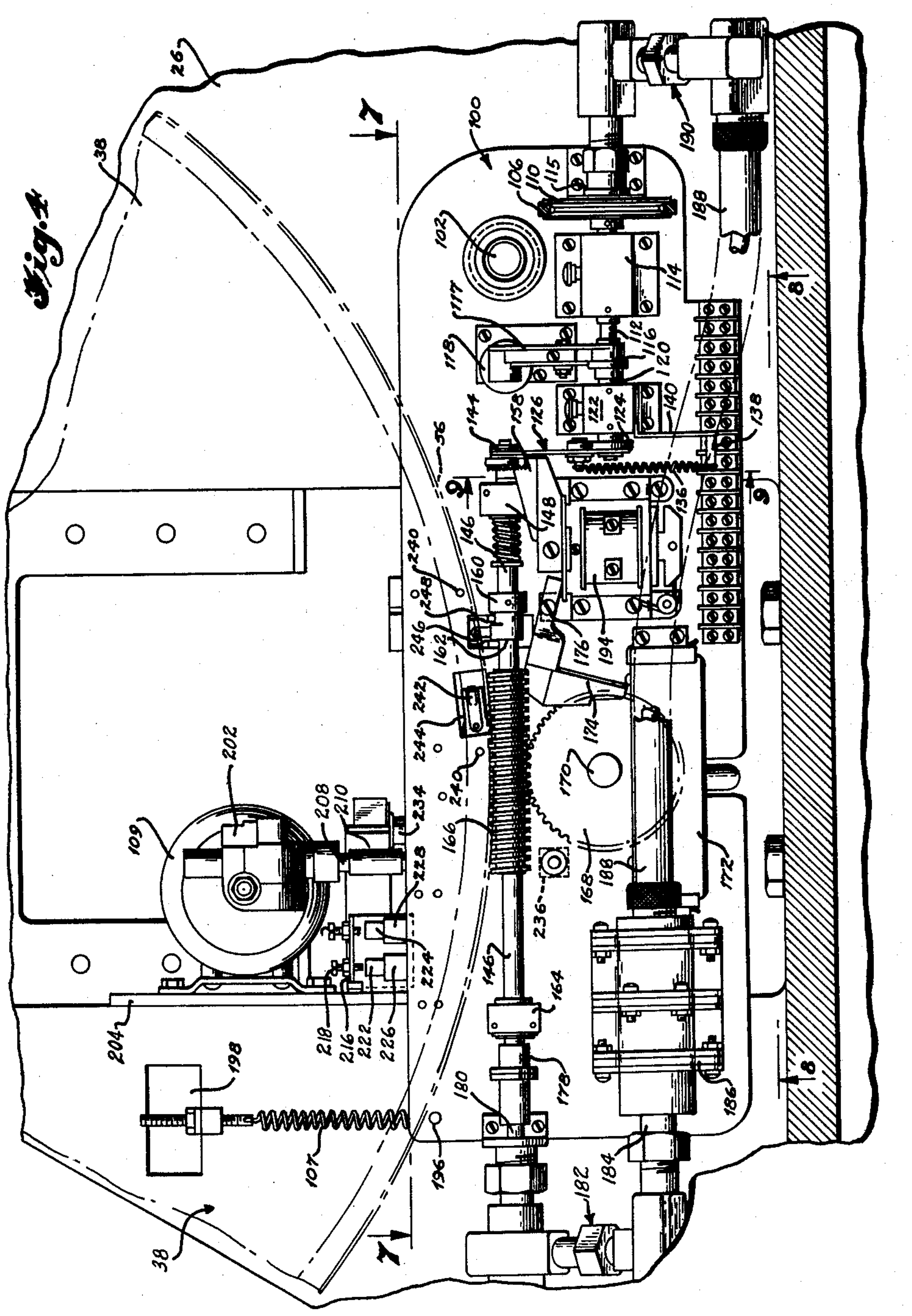
FIGURE 4 is an elevation of one of the drive mechanisms, the view looking toward the apparatus from the rear and showing, on an enlarged scale, structure partially illustrated at the lower portion of FIGURE 3.

As is described in said Cohen et al. and Coombs et al. applications, the drum may have an outside diameter of thirty-four inches and a width of approximately ten and one-half inches. The drum is formed of aluminum or other non-magnetizable material and will have its periphery covered with magnetic tape 54, as best shown in FIGURE 4, the tape being iron oxide coated paper tape or other suitable tape or coating including paramagnetic material. A number of signal or data storage tracks would be spaced or located upon the width of the drum so that each track extends circumferentially of the drum. With a drum 38 having a width of ten and one-half inches, forty tracks can be provided, with the track center-lines one-quarter of an inch apart. By the present invention, the forward edge of the drum 38 is provided with a circumferentially extending worm wheel 56 which comprises an element of one drive arrangement for the drum.

By the system illustrated in the drawings, each track upon the drum 38, other than the timing and control tracks, will have a group of three magnets 52 associated therewith, the three magnets being respectively mounted on vertically adjacent cross bars 50 so that they will be spjaced circumferentially of the path of the drum. The uppermost magnet, designated 58, of each group, will be a re-writing or altering magnet, the next lower magnet designated 60 may be used for erasing, as well as for original or fresh recording or writing, while the lowermost magnet 62 of the series is a reading magnet. As is indicated in FIGURE 2, because the magnets must usually be of a greater width than the drum tracks with which they are associated, the three upper cross bars 50 carry the magnets for alternate tracks of the drum and the magnets for the intervening tracks are supported upon the three lower cross bars 50.

Figure 11:
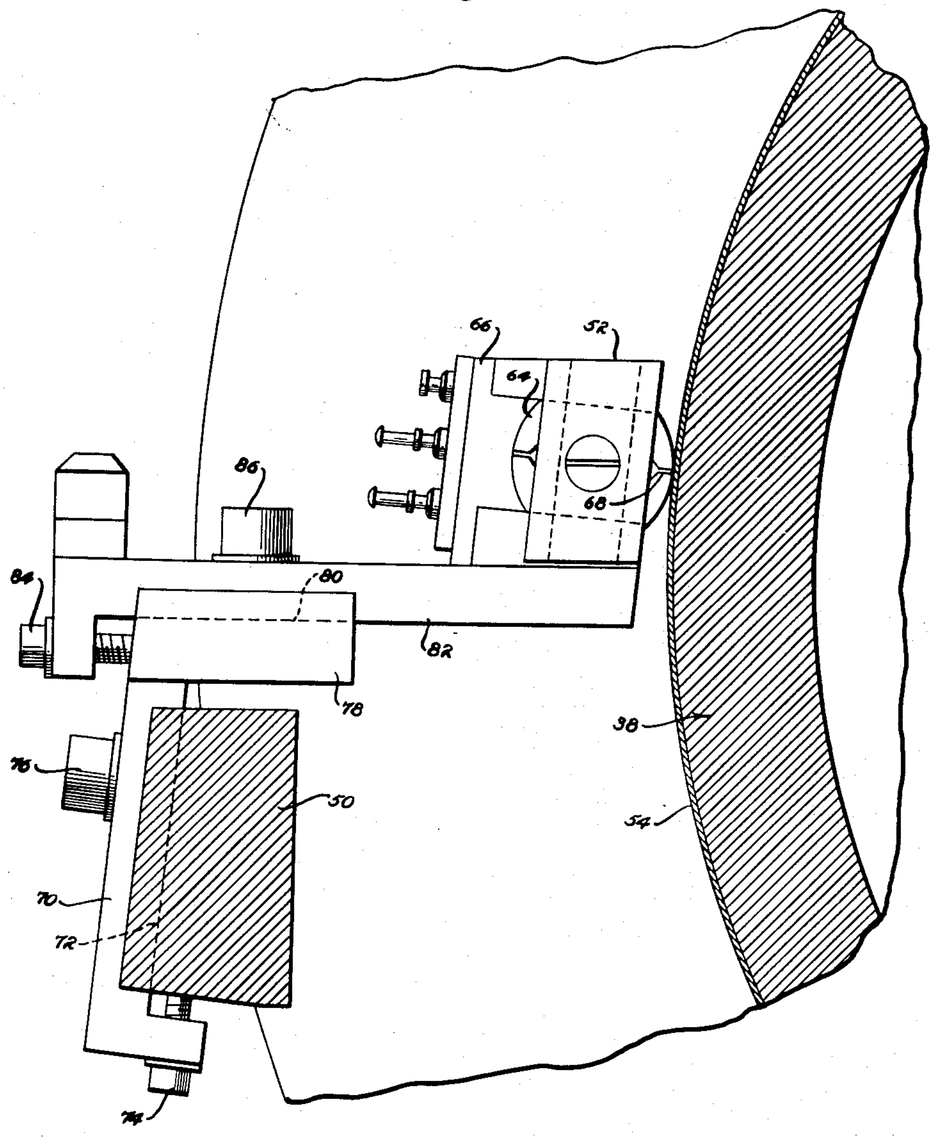
FIGURE 11 is a fragmentary view showing the manner of supporting a magnetic head with respect to the drum.

FIGURE 11 discloses the manner of mounting each magnet with respect to the corresponding cross bar 50 and drum 38. A magnet includes two coils, each wound on one of the two cores 64. The cores 64 are supported in a non-magnetic holder 66, the forward gap 58 of the magnet being positioned approximately .002 inch from the paramagnetic tape or surface 54 of the drum. In order to enable the magnets to be adjusted radially as well as circumferentially of the drum, the following mounting for the magnets is provided. A bracket 70 of substantially U-shaped form is fitted in a vertically extending groove 72 provided in the cross bar 50, the lower leg of the bracket being provided with a set screw 74 adapted to contact with the under surface of the bar so that the position of bracket 70 can be adjusted vertically of the bar and its magnet thereby can be adjusted circumferentially of the drum 38. A locking bolt 76 extends through a slot in the vertically arranged plate of bracket 70 and into a bore in bar 50 to lock bracket 70 in adjusted position. The upper portion 78 of bracket 70 is grooved as indicated at 80 to closely receive a magnet holder 82. The holder 82 is provided with a set screw 84 at its outer end to enable the holder, as well as the magnet, to be adjusted radially of the drum. A locking bolt 86 extends through a slot in the holder 82 and into a threaded bore in bracket 70 to lock the holder in adjusted position.

Figure 2:
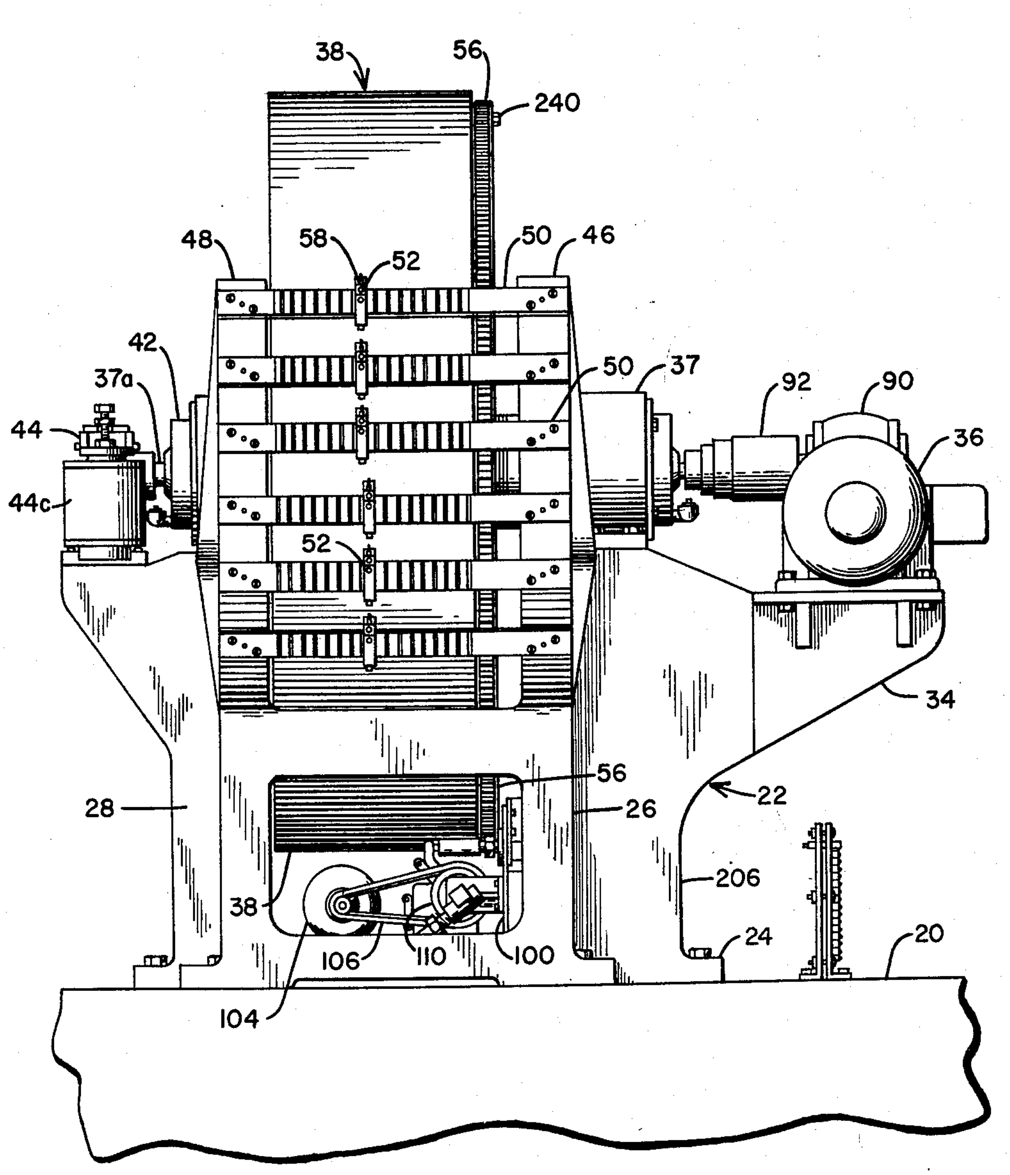
FIGURE 2 is a side view looking toward FIGURE 1 from the left of the latter figure.

Motor 36 illustrated in FIGURES 1 and 2 is used to drive the drum 38 continuously at high speed and with continuous and uniform movement. The motor performs its driving function through a reduction gearing enclosed in casing 90 and an overrunning clutch enclosed at 92. The motor will usually drive the drum at a speed of the order of 220 r.p.m. The brake 44 shown in FIGURE 2 is electrically operated to stop rotation of the drum in a reasonably short time after power to motor 36 has been cut off. It will be perceived that motor 36 comprises a means to drive the drum continuously at high speed. Drive of the drum by motor 36 will be used during erasing and reading of data, as well as during altering or re-recording of data.

As is best shown in FIGURES 4 to 8, and particularly in FIGURE 4, within the supporting frame 22 and beneath drum 38 a carrier plate generally designated 100 is pivoted to the front frame wall 26. The pivot for carrier plate 100 is a stud 102 extending horizontally and rearwardly from the frame wall 26 so that the carrier plate 100 may have a swinging movement in a vertical plane lying parallel to the radial faces of the drum. Stud 102 extends through the frame wall 26 and is secured in position by a nut 103 bearing against the opposite side of the frame wall. It will be observed that carrier plate 100, being pivoted upon the forward frame plate 26, will be positioned substantially beneath the worm wheel 56 of drum 38. This relationship of the carrier plate 100 to the worm wheel 56 as well as the remainder of the apparatus can best be ascertained from FIGURE 2 which shows the plate 100 as viewed from the right of FIGURE 4.

Carrier plate 100 supports various driving connections to rotate drum 38 step by step during recording and alteration of data upon the drum. In addition, carrier plate 100 supports driving connections to "home" the drum, viz., bring a predetermined point on the drum to a recording or writing starting position with respect to the magnets. This homing drive includes connections to first move the drum by continuous movement until it is adjacent starting or "home" position and then move the drum step by step through a further brief rotation until the actual home position is reached. These driving connections are discussed in the immediately following section, while the controls therefor are discussed under the section headed "Drive Controlling Circuits."

DRIVE ELEMENTS

Figures 5, 6:
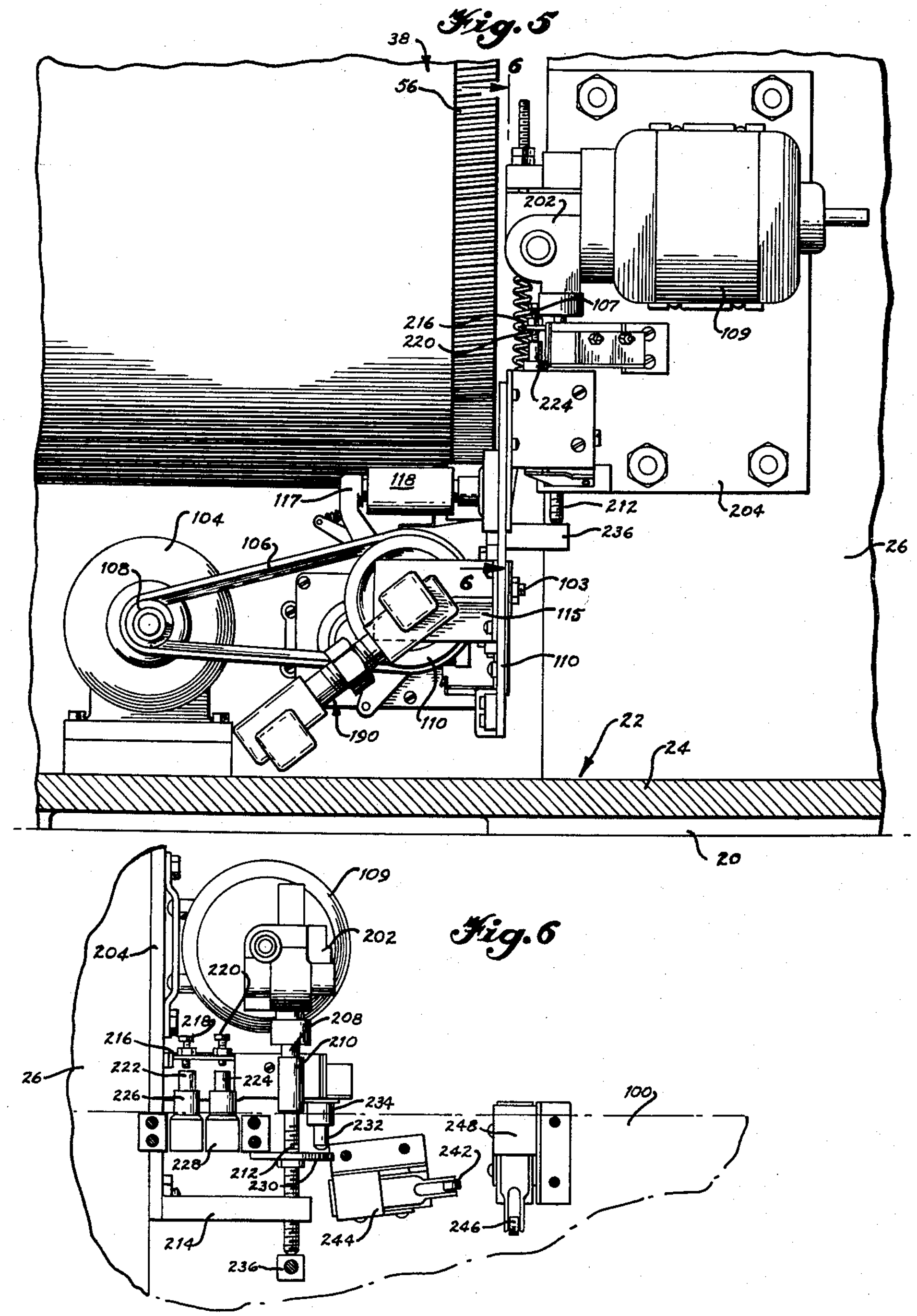
FIGURE 5 is a view of the drive mechanism of FIGURE 4 looking from the right toward the latter figure.
FIGURE 6 is a vertical sectional view on the line 6—6 of FIGURE 5.

As is best shown in FIGURE 5, the driving connections or elements on carrier 100 are driven from a motor 104 secured to the base plate 24 of supporting frame 22. It will be noted that a belt 106 moving about a pulley 108 on the drive shaft of motor 104 extends about a pulley 110 fixed to a shaft 112 journalled in brackets 114 and 115 fixed to carrier plate 100. By comparing FIGURES 4 and 5, it will be observed that the axis of the motor pulley 108 is at right angles to the axis of stud 102 about which the carrier plate 100 swings. However, because the swinging movement of carrier 100 is very slight and also because the driven pulley 110 carried by carrier 100 is closely adjacent the axis of swinging movement of the carrier, as well as because belt 106 is flexible, motor 104 will drive pulley 110 in every position carrier 100 can assume.

Carrier 100 is drawn to upward position by spring 107, this movement being controlled by a motor 109. Motor 109 also moves carrier 100 downwardly, all as hereinafter explained in detail.

Figure 7:
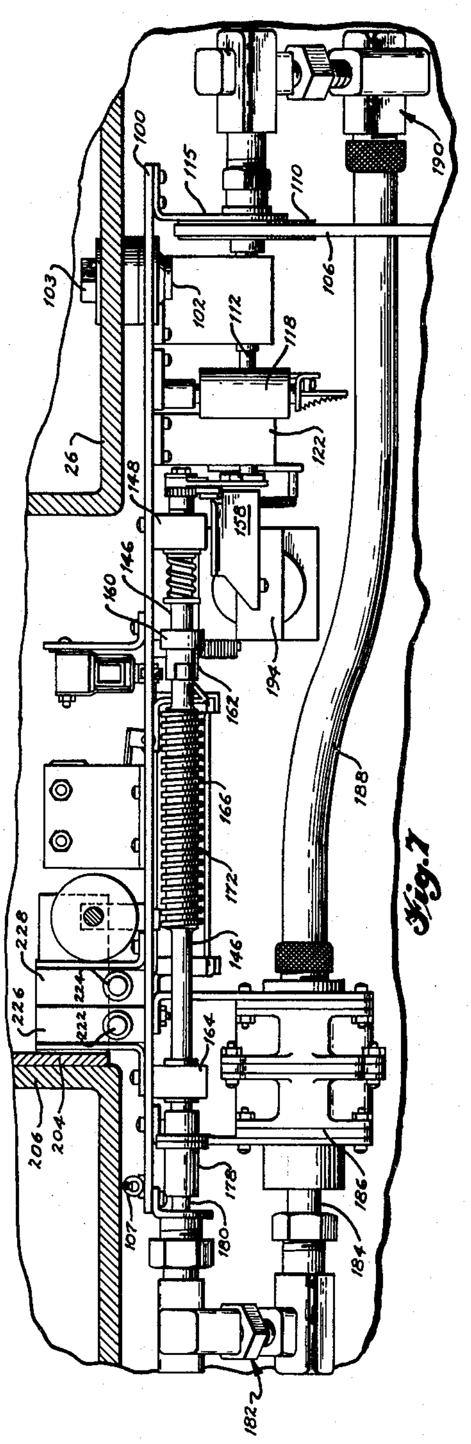
FIGURE 7 is a view of the driving mechanism taken on the line 7—7 of FIGURE 4.
Figure 8:
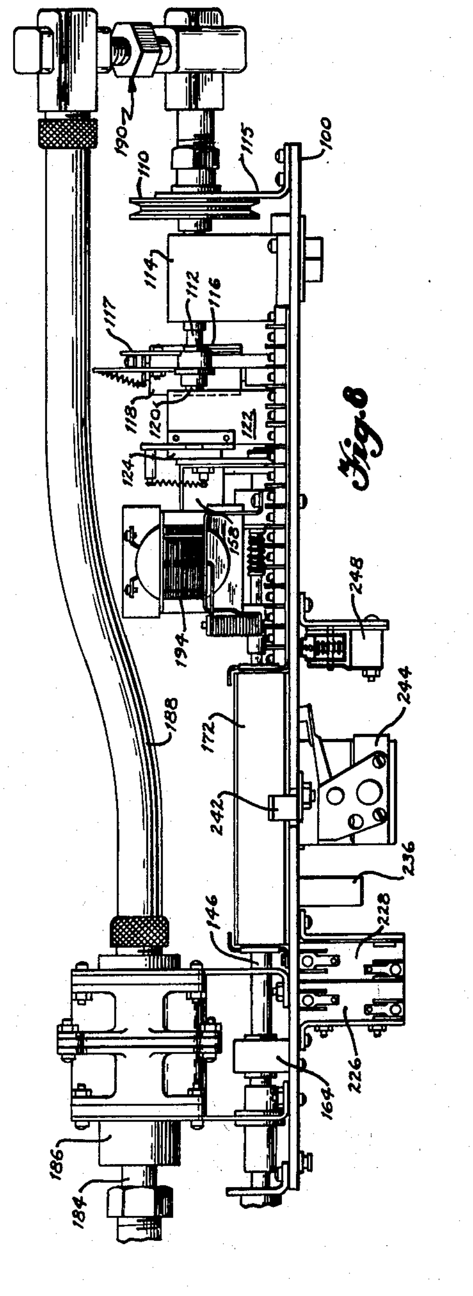
FIGURE 8 is a view on the line 8—8 of FIGURE 4, viz., a bottom view of the drive mechanism of FIGURE 4.

As is indicated in FIGURES 4, 7 and 8, the shaft 112 to which pulley 110 is fixed extends into a one-revolution clutch, indicated at 116, and actuated by a mechanism 117 controlled by an electromagnet 118. By this arrangement, when shaft 112 rotates with continuous movement, the driven shaft 120 connected to the one-way clutch 116 will only be rotated when the magnet 118 controlling mechanism 117 has been energized, and, when magnet 118 is energized, shaft 120 will only be rotated for a single revolution, and will then stop. It will be observed that clutch 116 thus comprises a periodic engagement clutch.

Figure 9:
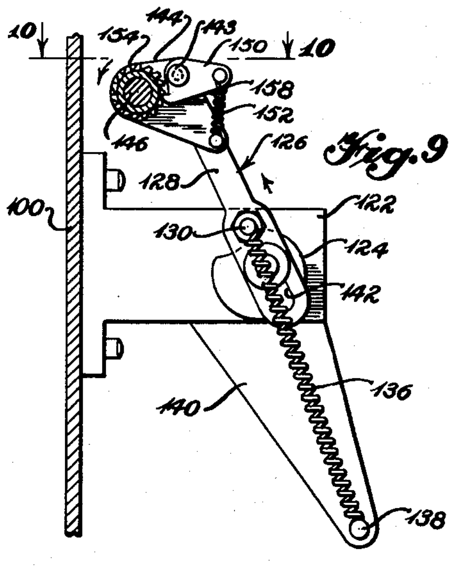
FIGURE 9 is a detail vertical and transverse section on the line 9—9 of FIGURE 4.
Figure 10:
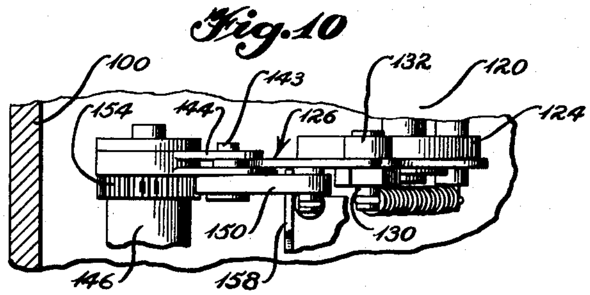
FIGURE 10 is a detail section on the line 10—10 of FIGURE 9.

Shaft 120 is journalled in a bracket 122 fixed to carrier plate 100 and the opposite end of the shaft (the left-hand end in FIGURES 4, 7 and 8) has a cam 124 fixed thereto. As is best shown in FIGURES 9 and 10, a cam follower or pawl actuator generally designated 126 is associated with the cam 124, the cam follower including an arm 128 having a pin 130 secured at one end thereof and which pin has a roller 132 mounted thereon. A spring 134 extending between the pin 130 and a pin 138 fixed to an arm 140 fixed to journal bracket 122 holds the roller 132 in engagement with cam 124. The movement of the arm 128 with respect to the cam is guided by the provision of a slot 142 in arm 128 and which slot rides on shaft 120 adjacent cam 124. The opposite end of cam follower arm 128 is pivotally connected at 143 to an arm 144 pivotally mounted upon the end of a shaft 146 journalled in a bracket 148 also fixed to carrier 100. As is shown in FIGURES 10 and 4, shaft 146 is parallel to but offset from the driven shaft 120 which carries cam 124.

A pawl 150 is also pivoted on pin 143. Pawl 150 is normally urged in a clockwise direction as viewed in FIGURE 9 and about its pivot 143 by the action of a coil spring 152 which extends from the outer end of the pawl to the arm 144. Pawl 150 is adapted to engage a ratchet wheel 154 fixed to the shaft 146.

It will be observed that by the arrangement disclosed in FIGURES 9 and 10 and described above, each complete rotation of cam 124 resulting from the operation of the one-revolution clutch 116 will cause cam follower arm 128 to be moved upwardly, thereby swinging the pawl-carrying arm 144 in a clockwise direction with respect to FIGURE 9 so that pawl 150, being in engagement with ratchet wheel 154, will rotate shaft 146 a slight distance. The spring 152 will be of sufficient strength to hold the pawl 150 in driving engagement with the ratchet wheel 154 during this upward and driving movement of the pawl. During return movement of cam follower or pawl actuating arm 128, spring 152 will permit the pawl 150 to ride back over the teeth of the ratchet wheel. The stroke of the cam follower 128 is only sufficient to advance shaft 146 by the length of one tooth of ratchet wheel 154. Ratchet wheel 154 preferably will be provided with about ten teeth so that its extent of rotation on each driving movement of the pawl will be relatively slight and of the order of 36°.

As is hereinafter explained, the pawl 150 can be moved out of engagement with the ratchet wheel 154 by the action of a pawl throw-out or release member 158 in lifting the pawl, viz., rotating it in a counterclockwise direction on its pivot 143 and against the action of a spring 152. When the pawl is thus lifted it will be disconnected from the ratchet wheel 154 and cannot impart any drive to shaft 146.

As is best shown in FIGURES 4, 7 and 8, shaft 146 extends through a second journal bracket 160 and, immediately beyond that bracket, has a cam 162 fixed thereto, the cam including a peripheral tooth or rise 163. The purpose of cam 162 is hereinafter described. Adjacent its opposite end, shaft 146 is journalled in a bracket 164. Between the journal 164 and cam 162, shaft 146 has a worm gear 166 fixed thereto. Worm gear 166 is adapted to mesh with the worm wheel 56 fixed to drum 38 when the carrier plate 100 is swung upwardly on its pivot 102 to a position such as shown in FIGURE 4. A spring 147 surrounding shaft 146 between journal 146 and a collar 147*a* mounted on the shaft acts as a thrust bearing.

It will be observed from FIGURE 4 that a second worm wheel 168 meshes with worm gear 166 and that worm wheel 168 is rotatable about an axis 170 positioned below worm shaft 166. Worm wheel 168 is an idler and rotates in a trough 172 of lubricant to thereby convey lubricant to worm gear 166 and thence to worm wheel 58. A wiper strip 174 pivoted at 176 on carrier plate 100 includes teeth which mesh with the teeth at one end of worm gear 166 to wipe excess lubricant from the latter and return it to the trough 172.

If desired, a felt wiper supplied with lubricant can be used to lubricate the worm gearing, instead of the trough 172 and wiper strip 174.

Beyond journal bracket 164 (to the left in FIGURES 4, 7 and 8), the worm carrying shaft 146 extends into an overrunning clutch 178. The other shaft 180 connected with overrunning clutch 178 extends into a drive adaptor comprising an enclosed series of shafts and gears generally designated 182. By means of adaptor 182, shaft 180 is drivingly connected to a parallel shaft 184 which extends into a magnetic clutch 186. It will be perceived that drive adaptor 182 simply comprises means whereby the parallel shafts 180 and 184 are drivingly connected for rotation in the same direction. The housing of magnetic clutch 186 is fixed to carrier plate 100.

As shown in FIGURES 7 and 8, driving connections extend to the right from magnetic clutch 186, these connections comprising an enclosed flexible shaft generally designated by the numeral 188. At its opposite end flexible shaft 188 is connected to a drive adaptor generally designated 190 and having the same function as the drive adaptor 182. Drive adaptor 190 is connected to the shaft 112 to which pulley 110 is fixed.

It may be generally explained at this point that when the magnetic clutch 186 is de-energized or disengaged, rotation of the shafting within the adaptor 190 and the resultant rotation of the flexible shafting 188 will have no effect in driving worm gear 166 because rotation of the just-mentioned enclosed shafts will have no driving effect upon the shaft 184 extending into the opposite end of the magnetic clutch 186. As a result, when the magnetic clutch is de-energized, rotation of pulley 110 and shaft 112 from the motor 104 will simple cause the worm shaft 166 to be rotated step by step. The speed of this movement will be of the order of ten steps per second and, on each step, the drum will move forward by the distance between the centers of two adjacent data-receiving cells or areas. Overrunning clutch 164 is of such design that when worm shaft 166 is being rotated step by step by the action of pawl 150, no drive will be transmitted from shaft 146 to shaft 180. This action of overrunning clutch 164 relieves pawl 150 of the load of driving the drive adaptor 182.

In order to disengage the step-by-step drive of worm gear 166, the pawl throw-out electromagnet 194, best shown in the lower central portion of FIGURE 4, is energized so that the trip 158 fixed to its armature will be lifted as viewed in FIGURE 9 to thereby swing pawl 150 counterclockwise against the action of the spring 152. As has hereinbefore been explained, the result of this will be that shaft 146 will not be driven by the pawl despite the fact that pulley 110 may be rotated by motor 108 and regardless of whether the one-revolution clutch 116 may be actuated by its electromagnet 118. With the drive mechanism in this condition, and with the magnetic clutch 186 energized, rotation of pulley 110 and shaft 112 by motor 104 will result in a drive through drive adaptor 190, flexible shaft 188, magnetic clutch 186, drive adaptor 182, as well as through the overrunning clutch 164, to the worm shaft 146 and its worm gear 166. This drive will be by continuous rotation at the speed of the motor 104 and will rotate the drum at a speed of the order of one revolution per minute.

As has been indicated above, the carrier plate 100 is drawn upwardly, viz., swung clockwise about its pivot 102, as viewed in FIGURE 4, by the action of spring 107. One end of spring 107 is connected to a pin 196 fixed to the upper free corner of carrier plate 100 and the opposite end of the spring is adjustably connected to a bracket 198 fixed to the frame wall 34. In order to control upward movement of carrier 100 downwardly to place the worm gear 166 in either loose or tight meshing relation with the worm wheel 56 of drum 38, or to move it downwardly to completely disengage worm gear 166 from worm wheel 56, the mechanism described immediately below is provided.

As is best shown in FIGURES 4, 5 and 6, a motor 109 and speed reducer 202 are fixed to a plate 204 which, in turn is fixed to the vertical wall of a forward extension 206 of the forward frame wall 26. As best shown in FIGURE 6, the driven shaft 208 of the gear reducer 202 extends downwardly. At its lower end shaft 208 has a fitting 210 fixed thereto in which the upper end of a shaft 212 is slidably keyed. In other words, while shaft 212 is free to move upwardly and downwardly with respect to the fitting 210 and shaft 208, shaft 212 must rotate with shaft 208 and fitting 210. The portion of shaft 212 below fitting 210 is threaded and, adjacent its lower end, shaft 212 is threadedly engaged in a bore formed in a block 214 also fixed to the motor supporting plate 204. As a result, rotation of threaded shaft 212 with shaft 208 will cause it to move upwardly or downwardly in block 214 and fitting 210, depending upon its direction of rotation with motor 109, which is reversible.

It will be observed that because motor 109 controls the position of worm 166 with respect to the drum worm wheel 56, motor 109 may be regarded as a worm or drum drive positioning motor.

A horizontal plate 216 fixed to the motor supporting plate 204 carries a pair of adjustably positioned set screws or limit stops 218 and 220 which are respectively adapted to cooperate with switch actuating plungers 222 and 224. The plungers 222 and 224 respectively form the operating elements of microswitches 226 and 228 fixed to the upper edge of carrier plate 100, preferably upon the opposite side or face of the carrier from that on which the above-described worm driving mechanism is mounted. The threaded shaft 212 also has a disc 230 adjustably fixed thereto and which is adapted to cooperate with the actuating plunger 232 of a microswitch 234 fixed to the motor supporting plate 204. The lower end of threaded shaft 212 is adapted to engage a block or lug 236 which extends forwardly from carrier plate 100. As is shown in FIGURES 5 and 8, lug 236 also projects from the face of the carrier plate other than the face which carries the worm driving mechanism hereinbefore described.

When the carrier plate 100 is in the upward position shown in FIGURE 4, switch 226 will be open because its plunger 222 will be in its extreme inward or downward position. Switch 226, which may be termed the full disengagement switch, closes or makes contact when its plunger moves to fully upward position with respect to the casing of plunger 222, and the plunger cannot reach that position until worm 166 is fully disengaged from worm wheel 56.

The action of motor 109 and threaded shaft 212 to swing the carrier plate 100 downwardly is as follows: When it is desired to move the worm gear 166 of worm shaft 146 entirely out of engagement with the worm wheel 56 of drum 38, motor 109 is energized to rotate shaft 208 and fitting 210 in such direction that rotation of threaded shaft 212 will cause the latter, by reason of its threaded engagement with block 214, to move downwardly.

The downward movement of threaded shaft 212 will act upon the lug 236 fixed to the carrier plate 100 to swing the plate downwardly or counterclockwise, as viewed in FIGURE 4, about its pivot stud 102. The driving action of motor 109 will continue until the downward swinging movement of carrier plate 100 has proceeded far enough to permit the actuating plunger 222 of switch 226 to move outwardly or upwardly with respect to switch 226 to thereby break the driving circuit of motor 109. Because the worm gear 166 is now entirely free of worm wheel 56 of drum 38, the latter can be rotated at high speed by the action of its driving motor 36.

It is desirable to enable the carrier plate 100 to be swung upwardly to bring worm gear 166 into loose engagement with worm wheel 56 that the drum 38 can be driven at relatively slow speed and by continuous movement or to bring worm 166 into tight engagement with worm wheel 56 so that drum 38 can be driven step by step. Certain controls for automatically effecting such operation, as well as downward movement, are hereinafter described but, in general, the action is as follows: To swing carrier 100 and worm 166 upwardly, the driving circuit for worm positioning motor 109 will be energized to rotate threaded shaft 212 in such direction as to cause it to rotate upwardly through block 214. This upward movement of shaft 212 will permit spring 107 to swing carrier plate 100 upwardly, but this upward swing will, of course, be limited by the engagement of shaft 212 with lug 236 fixed to carrier plate 100. As is hereinafter explained, during upward movement of carrier plate 100 and worm 166 the actuating plunger 224 of microswitch 228 will contact with stop 220, at which time switch 228 will be opened. Switch 228 is closed when its plunger 224 is in its extreme outward or upward position with respect to the plunger casing and is opened when plunger 224 is depressed with respect to the switch. Stop 220 will be adjusted to a position wherein it will open switch 228 when carrier plate 100 swings upwardly sufficiently far to cause worm 166 to be positioned in loose driving engagement relationship with worm wheel 56 of drum 38 and the switch will remain open during further upward movement of the carrier. In the loose driving engagement, the two gears will be out of close or maximum mesh with each other by a distance of the order of several thousandths of an inch, so that they will have such a driving relationship that the drum can be rapidly rotated without undue resistance between gears 166 and 56.

When drum 38 is to be driven step by step, it is desirable that worm gear 166 closely and tightly engage the worm wheel 56 so that any desired cell or area on the drum can be brought into exactly aligned position with an erasing and recording magnet 60 for recording purposes. By this arrangement, there will be no possibility of corresponding magnetized areas being out of a desired alignment of registry. In order to bring worm gear 166 and worm wheel 56 into this tight meshing engagement the circuit to motor 109 is closed to cause it to rotate in such direction as to draw threaded shaft 212 further upwardly through block 214. Such rotation will be continued until carrier plate 100 has swung upwardly under the influence of spring 107 a sufficient distance to permit worm gear 166 to tightly engage worm wheel 56. Rotation of shaft 212 will continue for an instant after this occurred and so that the lower end of the shaft will move entirely out of engagement with the lug 236 of carrier plate 100. Then the disc 230 fixed to the threaded shaft 212 will engage the plunger 232 of the microswitch 234 to move that plunger upwardly or inwardly to thereby break the driving circuit of motor 109. As is indicated in FIGURE 12, the contact 212' carried by the plunger of switch 234 has two fixed contacts 234A and 234B in its path. Contact 234A will be engaged by the plunger contact 212' when worm 166 and worm wheel 156 are tightly engaged, while contact 234B will be engaged when the two worm gears are either in loosely engaged position or fully disengaged position, as well as in positions intermediate the two last-mentioned positions.

DRIVE CONTROLLING CIRCUITS

FIGURES 12 and 13 diagrammatically show the control circuits and elements whereby drum 38 will be connected to one of the several sources of power and then driven as best suited for each of the several principal operations of the drum. These several operations are (*a*) high-speed reading or analyzing of data which has been recorded upon the drum, (*b*) high-speed recording, (*c*) high-speed erasing of data from the drum, and (*d*) at low speed, either recording new data upon the drum or altering data which has already been recorded upon the drum.

As is hereinafter explained, the drum will be rotated continuously at a speed of the order of 220 r.p.m. when operations (*a*) to (*c*) are to be performed. In order to connect drum 38 to the high speed driving motor 36 for this type of drive, the control circuits and elements of FIGURES 12 and 13 operated in approximately the same manner. However, when operation (*d*), viz., the step-by-step or slow speed recording or altering of data, is to be performed, the connection of the drum to the step-by-step driving means through worm 166 can be carried out under any one of three conditions. These three conditions are hereinafter termed "Automatic Homing," "Recycle" and "Non-Homing."

Generally speaking, the matter of which of the three conditions will be used to obtain the drive used during operation (*d*) will depend on how drum 38 is connected to the driving means at the moment when it is desired to change over to operation (*d*), or whether the operator wishes to bring the starting or "Homing" point of the drum into alignment with the magnets. However, once the circuits of FIGURES 12 and 13 have been actuated under the selected condition to provide the drive for operation (*d*) the drive of the drum during that operation will always be the same, viz., at the rate of approximately ten stepped movements per second.

FIGURE 14 diagrammatically indicates the sequence of the operation of the various elements of the control circuits, including relays R1 to R9 and the switches 226, 228, 234, 244, and 248, during operations (*a*), (*b*), (*c*) and (*d*). However, while FIGURE 14 shows the action of all of the elements in the proper relationship to each other, the time duration of those actions is not accurately proportioned in the figure.

The matter of whether the circuits are to be operated for use of the drum for (*a*) high speed reading, (*b*) high speed erasing, or (*d*) slow speed recording or alteration, is determined by an Operation Selection switch OS indicated in FIGURE 12 and comprising three blades OS1, OS2, and OS3 which are connected to pivot together but are insulated from each other. In order to select which of the three conditions will be used to bring worm 166 into tight engagement with drum worm wheel 56 for step-by-step drive during operation (*d*), above, there is provided (FIGURE 12) the Condition Selector switch CS. Switch CS includes three blades CS1, CS2, and CS3 which also pivot together but are insulated from each other.

In connection with FIGURES 12 and 13, it may be stated that the following system is used in designation of the movable contacts of the relays R1 to R9: Each contact blade reference character has the initial letter C, and the first number of the reference character corresponds to the relay number. The second number of each reference character is an even number if the contact is open when the relay is de-energized, and is an odd number if the contact is normally closed when the relay is de-energized.

FIGURES 12 and 13 illustrate Operation Selector switch OS at "Recording," and Condition Selector switch CS at "Automatic Homing." However, it assumes that these switches have just been moved to that position and, therefore, shows relays R1 to R9 de-energized, switches 244 and 248 in their normal condition, and switches 226, 228 and 234 in the position they occupy when worm 166 is fully disengaged from drum worm wheel 56. Leads extend between FIGURES 12 and 13, and the lower edge of FIGURE 12 must be aligned with the upper edge of FIGURE 13.

*Drive Controlling Circuits—Reading—Worm Initially in Disengaged Position*

Referring to FIGURE 12, if reading or analyzing of the data upon the drum 38 is to be performed, the Operation Selector switch OS will be moved to bring its blades OS1, OS2, and OS3 respectively into engagement with the fixed contacts 301, 302, and 303, which are the "Reading" contacts of that switch. The operator will then momentarily close the starting switch S3. If worm 166 is in fully disengaged position, i.e., entirely out of engagement with the drum worm wheel 56, so that the contact movable with plunger 222 of full disengagement switch 226 shown in the upper left-hand portion of FIGURE 12 is in engagement with fixed contacts 226A and 226A', the following circuit will be closed when starting switch S3 is closed: From one conductor 304 (top of FIGURE 13) of a 60 volt D.C. line, by lead 305 extending (FIGURE 12) to the fixed contact 226A, through the contact blade of switch 226 to fixed contact 226A', and thence by leads 306 and 307 to blade OS1 of switch OS, by contact 301 and lead 308 through normally closed stop switch S4, lead 309 to contact 310 of starting switch S3, through the closed contact of that switch to contact 311, by leads 312 and 313 to the coil of relay R1 and thence by lead 314 to the other conductor 315 of the 60 volt D.C. line.

The energization of relay R1 will cause its normally open contacts C10, C12, C14, and C16 to close. The closing of contact C10 will set up a holding circuit by lead 316, across the now closed contact C10 and by leads 317 and 313, through the coil of relay R1 so that the starting switch may open, and the relay will be held energized until stop switch S4 is opened.

Independently of the closing of starting switch S3 or any operation of switch OS, the fact that worm carrier 100 and worm 166 are completely disengaged from drum worm wheel 56 will cause full disengagement switch 226 to be closed as shown in FIGURE 12. The fact that switch 226 is closed will cause relay R2 to be energized as follows: From conductor 304 of the 60 volt D.C. line, lead 305, switch 226 and lead 306 through the coil of relay R2 (FIGURE 13) and by lead 318 to conductor 315. Because relay R2 is energized, its contact C21 will be open. By being open, contact C21 will hold open a circuit through the worm positioning motor controlling relay R4, and which circuit would be closed if relay R2 were not energized and its contact C21 remained closed. The significance of this action is subsequently explained.

Referring again to the relay R1, when this relay is held energized as explained above, the motor 36 which drives the drum shaft **37*a* and drum 38 by continuous rotation at relatively high speed will be powered by the following circuits through the contacts C12 and C14 of relay R1: From the conductor 320 of a 220 volt A.C. line (center of FIGURE 12) across the closed contact C12, by lead 321 to motor 36, and thence by lead 322 across the closed contact C14 to the other conductor 323** of the 220 volt A.C. line.

Energization of relay R1 also causes the magnetic brake 44 which normally engages drum shaft **37*a* to be released by the following circuit controlled by contact C16 of relay R1: From conductor 326 of 110 volt D.C. line (lower right-hand corner of FIGURE 12) by lead 327, contact C16, leads 328 and 329, through the electromagnetic coil 44*c* to disengage brake 44 and thence by lead 330 to the other conductor 331** of the 110 volt D.C. line.

The above operations initiated by the closing of starting switch S3 are indicated in FIGURE 14 under the heading "Read" appearing in the upper left-hand corner of FIGURE 14 and under the legend "Move Switch OS to Read and Close Start Switch S3." In vertical order under this legend, the energization of the relay R1 is indicated by the rise R1*e* in the horizontal line representing the action of that relay, the energization of the motor 36 is represented by the rise 36*e* in the line representing the action of that motor and the disengagement of the brake 44 is represented by the rise 44*e* in the line indicating the action of the brake. The fact that switch 226 is closed during the foregoing action is indicated by the notation "Closed" in the line indicating the action of that switch, while the energization of relay R2 is designated by the notation "Energized" in the line corresponding to that relay.

As the result of the foregoing actions, drum 38 will now be rotated by continuous movement at a speed of the order of 220 r.p.m. As is hereinafter described under the heading "Magnet Controlling Circuits—Reading and Re-recording," by use of controls associated with the reading magnets 62 the data on the drum can be read. Alternatively, through erasing circuits associated with the erasing and recording magnets 60, data can be erased from drum 38. The movement of the drum can be stopped whenever desired by operating the stop switch S4 of FIGURE 12, thereby breaking the holding circuit through relay R1 so that all of its four contacts will drop to open the circuits therethrough. As a result, motor 36 will be de-energized and brake 44 will be applied. The same effect viz., the stopping of motor 36 and application of brake 44, will be obtained if switch OS is moved from the reading contacts 301, 302, and 303 to the "Erase" contacts 341, 342, and 343 or to the "Recording" contacts. This action is indicated in FIGURE 14 under "Read" and the legend "move switch OS from reading to erase." Reading vertically downwardly under that legend in FIGURE 14, the drops R1*d*, 36*d* and 44*d* associated with the lines respectively corresponding to the relay R1, motor 36 and brake 44 indicate this action as well as the action which would result if the closed stop switch S4 were opened.

*Drive Controlling Circuits—Reading—Worm Initially in Engaged Position*

All of the operations discussed under the preceding heading as occurring when switch OS is moved to "Reading" and starting switch S3 is closed assume that worm 166 is fully disengaged from worm wheel 56 of drum 38 and switch 226 is therefore closed when starting switch S3 is closed. However, if worm 166 is not fully disengaged from worm wheel 56, full disengagement switch 226 will not be closed. Therefore, when switch OS is moved to reading position, its blade OS1 will not be connected to conductor 304 through switch 226. In addition, starting switch S3 will not be connected to conductor 304 through switch 226. Hence, relay R1 cannot be energized to close the power circuit to motor 36 and disengage brake 44. Furthermore, the coil of relay R2 will not be connected to conductor 304 by switch 226. Therefore, when switch OS is moved to "Reading," the following circuit will be closed: From conductor 304 of the 60 volt D.C. line by leads 305 and 345 through the blade OS2 of switch OS, contact 302, leads 346 and 347 (continued on FIGURE 13), by lead 348 and the closed contact C21 of non-energized relay R2, lead 349, the closed contact C71 of non-energized relay R7, lead 350 to the coil of relay R4 and thence by lead 351 to the other conductor 315 of the 60 volt D.C. line. The energization of relay R4 will cause its normally open contacts C40, C42, C44, C46 and C48 to close, while its normally closed contacts C41 and C43 will open. The closing of contact C40 will close the following holding circuit through the coil of relay R4 so that it will remain energized until switch 226 closes: From the conductor 304 of the 60 volt D.C. line by lead 351*a* across closed contact C40, leads 352 and 348, closed contact C21 of non-energized relay R2, lead 349, the closed contact C71 of non-energized relay R7, lead 350, through the coil of relay R4 to lead 351 and the other conductor 315 of the 60 volt D.C. line.

The closing of the contacts C42 and C44 of relay R4 will close the following circuit through the field coil 109' of the worm positioning motor 109: From conductor 356 of a 110 volt A.C. line (lower right-hand corner of FIGURE 12) by a lead 357 (continued on FIGURE 13) and lead 358 across the closed contact C42, leads 359, 360 (continued on FIGURE 12) through the field coil 109', lead 361 (continued on FIGURE 13), closed contact C44, and thence by lead 362 (continued on FIGURE 12) to the other conductor 363 of the 110 volt A.C. line. The closing of the contact C46 and C48 of relay R4 will close the following circuit through the winding of worm positioning motor 109: From conductor 356 of the 110 volt A.C. line, leads 357 and 366, closed contact C46, leads 367 and 368 (continued on FIGURE 12), the winding of motor 109, lead 369 (continued on FIGURE 13) and 370, the closed contact C48 of relay R4 and then leads 371 and 362 to the other conductor 363 of the 110 volt A.C. line.

Motor 109 being reversible, and with its coil in series with its winding, the result of powering it by the circuit just described above will be to cause it to rotate shaft 208 (FIGURE 6) and the threaded shaft 212 so that the latter will move downwardly through the threaded lug 214 fixed with respect to the base of the machine and thereby exert pressure on the lug 236 fixed to the carrier plate 100. This action will cause the carrier plate 100 and the worm shaft 166 to be moved about the carrier plate pivot 102 and away from the worm wheel 56 carried by drum 38. The rotation of worm positioning motor 109 will continue until the warm shaft 166 and carrier 100 are in fully disengaged position with respect to worm wheel 56. When fully disengaged position is reached, the plunger 222 of full disengagement switch can move outwardly with respect to its casing shown in FIGURE 6 by reason of moving away from stop screw 218. The contact blade of switch 226 will thereby engage the fixed contacts 226A and 226A'.

When the full disengagement switch 226 closes, it will energize relay R2 by the circuit explained above in the third paragraph below the heading "Drive Controlling Circuits—Reading—Worm Initially in Disengaged Position." Such energization of relay R2 will cause its contact C21 to lift, thereby breaking the holding circuit through the coil of relay R4 so that the circuits through the contacts of relay R4 which have been supplying power to the worm positioning motor 109 will be broken, and the movement of the worm 166 away from the worm wheel 56 will stop.

If the operator has kept the starting switch S3 closed during the time that the worm 166 has been moving to full disengagement position, or if the operator now closes starting switch S3, relay R1 will be energized to close the same circuits to motor 36 and brake 44 as have been described above under the heading "Drive Controlling Circuits—Reading—Worm Initially in Disengaged Position." Therefore, the drum 38 will be continuously rotated at relatively high speed by motor 36.

It will be observed that once the operator moves Operation Selector switch OS to "Reading," the fact that a holding circuit is then established through the coil of relay R4 insures that the movement of worm 166 from worm wheel 56 will continue until the worm is fully disengaged and switch 226 closed to energize relay R2.

The action of relay R4 described above is not indicated on FIGURE 14.

*Drive Controlling Circuits—Erase*

If data upon any track or tape of the drum is to be erased, the operation selector switch OS will be moved to bring its blades OS1, OS2 and OS3 respectively into engagement with the fixed "erase" contacts 341, 342, and 343. Because the erase contact 341 associated with blade OS1 is directly connected to "reading" contact 302, the same action of the drive controlling circuits will occur when switch OS is moved to "erase" position and start switch S3 is closed as occurs when switch OS is moved to "reading" position. These actions have been discussed above under the immediately preceding headings "Drive Controlling Circuits—Reading—Worm Initially in Disengaged Position" and "Drive Controlling Circuits—Reading—Worm Initially In Engaged Position."

As the result of the foregoing, drum 38 will now be rotated by continuous movement at a speed of the order of 220 r.p.m. Through the controls hereinafter described under the heading "Magnet Controlling Circuits—Reading and Re-recording" and associated with the erasing and recording magnets 60, data can be erased from drum 38. The high speed rotation of the drum can be stopped whenever desired by operating the stop switch S4 of FIGURE 12.

It will be observed that all of the circuit operations discussed above will occur regardless of the position of the Condition Selector switch CS. That is, switch CS can have no part in controlling any of the drive controlling circuits so long as Operation Selector switch OS is in "reading" position or "erase" position.

It will be observed that the lines of FIGURE 14 indicate the energization of relay R1, the operation of drum driving motor 36 and brake 44 upon movement of the Operation Selector switch to "erase" in the same manner as occurs upon movement of switch OS to "reading."

*Drive Controlling Circuits—Recording*

As has been mentioned above, when the drum 38 is to be moved step-by-step for recording thereon, the circuits illustrated in FIGURES 12 and 13 may be operated in any one of several ways or conditions to obtain the desired driving connection of the drum driving worm 166 to the drum worm wheel 56. These three conditions of operation are hereinafter respectively termed "Automatic Homing," "Recycle," and "Non-Homing." The operation of the circuits of FIGURES 12 and 13 under each of the three conditions is hereinafter separately discussed under headings respectively including the above terms.

*Drive Controlling Circuits—Recording Automatic Homing*

The operation of the circuits of FIGURES 12 and 13 under Automatic Homing condition may be generally described as involving the inward swinging movement of worm carrier 100 and worm 166 from fully disengaged position with worm wheel 56 to loose engagement with the worm wheel. This inward movement is occasioned by spring 107 under the retarding action of worm positioning motor 109. The retarding action is effected by the movement of threaded shaft 212 (FIGURE 6) away from lug 236 of carrier plate 100. Worm 166 is continuously rotated by motor 104 during this swinging movement. When the loose engagement of the worm and worm wheel occurs, worm 166 will rotate drum 36 by relatively slow continuous rotation of the order of 1 r.p.m. until coarse homing of the drum is obtained; that is, the point on drum 38 at which all data starts, or which is used as a starting location for all data, comes closely adjacent starting alignment with the recording and erasing magnets 60. When coarse homing position is reached, then worm positioning motor 109 is again operated so that spring 107 can move worm 166 into tight engagement with worm wheel 56, and then worm positioning motor 109 is stopped. At the same time, the continuous rotation of the worm 166 stops and its step-by-step rotation begins. This step-by-step rotation of the drum continues until the homing point of the drum comes into alignment with the magnets 60. Then recording can be performed with the homing position used as a reference or starting point.

The following description of the actions occurring during the Automatic Homing Condition is divided into sections, each section bearing a heading wherein the final phase indcates the position worm 166 or drum 38 occupies.

*Drive Controlling Circuits—Recording—Automatic Homing—Full Disengagement*

Referring to FIGURE 12, assume that Condition Selector switch CS has been moved so that its blades CS1, CS2, and CS3 are respectively in engagement with the contacts designated "Auto Homing," namely, the contacts 381, 382, and 383. If Operation Selector switch OS is now moved to bring its blades OS1, OS2, and OS3, respectively, into engagement with the "Recording" contacts 391, 392, and 393, the operations described below will occur.

Because worm 166 is fully disengaged from worm wheel 56, full disengagement switch 226 will be closed. Therefore, relay R2 already will be energized independently of switches OS and CS through the following circuit: From conductor 304 of the 60 volt D.C. line by lead 305, through switch 226, leads 306 (continued on FIGURE 13) through the coil of relay R2 and thence by lead 318 to the other conductor 315 of the 60 volt D.C. line. This energization of relay R2 will cause its contact blade C21 to be open, thereby holding open a circuit through the coil of relay R4 to thereby prevent any possibility of relay R4 being energized. Relay R4, when energized, causes the worm positioning motor 109 to be rotated in a direction to move worm 166 away from worm wheel 56 which, of course, is not desired during the following operations. It will be observed that relay R2 is an overruling relay for the relay R4, the latter being the relay which actuates worm positioning motor 109 to move worm outwardly.

When switches OS and CS are operated as described above, the following circuit will be closed: From the conductor 304 of the 60 volt D.C. line by leads 305 and 345 through the blade OS2 of switch OS to its contact 392, by leads 395 and 396 through the coil of relay R3 and thence by lead 397 (continued on FIGURE 13) to the other conductor 315 of the 60 volt D.C. line. Relay R3 is a delayed closing relay and ordinarily will be set to prevent its contact C30 from closing until a period of approximately twenty seconds has elapsed after the movement of switch OS to recording position.

The reason for having relay R3 of the retarded energization type is as follows: Drum 38 may have been in use for reading or erasing and, therefore, has been rotating at high speed by drive from motor 36. Relay R3 is a master relay with respect to every other relay used during Automatic Homing condition, viz., the relays R5 to R9. Hence, by retarding energization of relay R3, no element involved in setting up the recording drive under this condition can operate until sufficient time has elapsed for the drum to stop rotation. By this arrangement, neither the worm wheel 56 or worm 166, nor any of the elements associated with the latter, can be damaged by reason of too early engagement of the worm and worm wheel. The importance of this will be apparent if it is realized that the movement of worm 166 into loose engagement position with worm wheel 56 requries but a few seconds.

When contact C30 of relay R3 closes, a circuit through the coil of the relay R5 (which controls worm driving motor 104) will be set up as follows: From conductor 304 of the 60 volt D.C. line by a lead 400, across closed contact C30, lead 401, blade OS3 and contact 393, lead 402 (continued on FIGURE 13) lead 403, through the coil of relay R5 and thence by lead 404 to the other conductor 315 of the 60 volt D.C. line.

Referring to FIGURE 14, the operation of the various elements during automatic homing is indicated in the portion of the figure above the legend "Automatic Homing Condition." Vertically in line below the top legend "Full Disengagement," the above-mentioned energization of the coil of delayed closing relay R3 is indicated by the rise R3*e* in the line of FIGURE 14 indicating the action of relay R3. The closing of the contact C30 of relay R3 is indicated in the dotted line rise C30′. It will be noted that the energization of relay R3 is indicated in FIGURE 14 as occasioned by the movement of switch OS from erase to record. However, it will be understood that the movement of switch OS to "record" position need not directly follow erasing operations.

Referring again to relay R5, energization of that relay will result in closing the following circuit through the motor 104 to drive worm 166: From the conductor 356 of the 110 volt A.C. line, leads 357 (continued on FIGURE 13) lead 406, contact C50, lead 407 (continued on FIGURE 12), motor 104, lead 408 (continued on FIGURE 13) contact C52, and then by leads 409 and 362 to the other conductor 363 of the 110 volt A.C. line.

In FIGURE 14, the above energization of relay R5 is designated by the rise R5*e* in the line indicating the action of that relay. The powering of motor 104 is indicated by the rise 104*e* in the line designating the action of that motor. As is explained immediately below, at the same instant that motor 104 is powered, pawl throw-out magnet 194 will be energized and magnetic clutch 186 will also be energized so that the motor 104 will drive worm 166 by continuous rotation through the magnetic clutch.

The closing of the circuit hereinbefore described through contact C30 of master relay R3 will set up a second circuit in parallel with the just described circuit through the coil of relay R5. The just-mentioned parallel circuit diverges, in the upper central portion of FIGURE 13, from lead 402 and includes lead 410, closed contact C81 of non-energized relay R8, leads 411 and 412, closed contact C63 of non-energized relay R6, lead 413 (continued on FIGURE 12) to the coil of relay R9 and thence by leads 414 and 415 (continued on FIGURE 13) to the conductor 315 of the 60 volt D.C. line.

Energization of relay R9 will cause its contacts C90 and C92 to close. The closing of contact C90 will complete the following circuit: From conductor 363 of the 110 volt A.C. line by lead 414*a*, across the closed contact C90, lead 415*a* through the electromagnet 194, and by lead 416 to the other conductor 356 of the 110 volt of the A.C. line. Energization of the coil of magnet 194 will cause its armature to move finger 158 upwardly, thereby swinging the pawl 150 in a counterclockwise direction as viewed in FIGURES 9 and 12 so that the pawl will be out of engagement with the ratchet wheel 154 fixed to worm shaft 146. Hence, shaft 146 cannot be driven by pawl 150 from shaft 112.

The closing of the other contact C92 of relay R9 will set up the following circuit: From the conductor 420 of the 24 volt D.C. line (shown in the upper right-hand portion of FIGURE 12), by lead 421 through the magnetic clutch 186, thence by lead 422 through contact C92 and then by lead 423 to the other conductor 424 of the 24 volt D.C. line. The engagement of the clutch 186 will cause motor 104 to drive the worm 166 through the drive arrangement shown in FIGURE 4, namely, by belt 106, the drive adaptor 190, flexible shafting 188, magnetic clutch 186, driven shaft 184 and by drive adaptor 182 to the shaft 146 to which the worm is fixed.

Referring to FIGURE 14, the energization of relay R9 is indicated by the rise R9*e* in the line designating the action of that relay. The rise 194*e* in the line designating the action of the pawl throw-out 194 and the rise 186*e* in the line designating the action of the clutch 186 respectively indicate that the pawl throw-out device is operated to disengage pawl 150 and that clutch 186 is engaged.

It will be observed that relay R9 is the pawl throw-out and clutch controlling relay.

Another result of the closing of contact C30 of master relay R3 is the powering of worm positioning motor 109 to permit spring 107 (FIGURE 5) to move worm 166 inwardly from fully disengaged position with respect to worm wheel 56. This circuit also leads from 60 volt D.C. conductor 304 through contact C30 of delayed closing relay R3, switch blade OS3, leads 402 and 410 through the contact C81 of non-energized relay R8, leads 411 and 425 (continued on FIGURE 12) to the movable contact 224' of loose engagement switch 228. Because, at this instant, the carrier 100 and worm 166 are in fully disengaged position with respect to the worm wheel 56, plunger 224 will be in fully outward position with respect to its casing shown in FIGURE 6 and, therefore, as shown in FIGURE 12, contact 224' carried by the plunger will be in engagement with fixed contact 228B of switch 228. The circuit beyond fixed contact 228B is by lead 426 (continued on FIGURE 13) then by closed contact C61 of non-energized relay R6, lead 427 (continued on FIGURE 12) to the movable contact 212' carried by the plunger 232 of tight engagement switch 234. Because carrier 100 and worm 166 are at this instant in fully disengaged position with respect to worm wheel 56, the plunger 232 of switch 234 will be fully outwardly of its casing 234 and, therefore, the movable contact 212' carried by plunger 232 will be in engagement with fixed contact 234B as indicated in FIGURE 12. Hence, from contact 234B the circuit will continue by lead 428 (continued on FIGURE 13) through the normally closed contact C43 of non-energized relay R4, lead 429 to the coil of relay R7, and then by lead 430 to the conductor 315 of the 60 volt D.C. line. Energization of relay R7 will thereby occur as indicated in FIGURE 14 by the rise R7*e* in the line indicating the action of relay R7.

Relay R7 closes circuits to cause the worm positioning motor 109 to move threaded shaft 212 away from the lug 236 on carrier plate 100 so that spring 107 can move the carrier plate and worm 166 toward worm wheel 56. It will be observed that R7 can only be energized when relay R4 which controls opposite movement of worm carrier 100 is de-energized. The circuits closed by energization of R7 are as follows: From conductor 356 of the 110 volt A.C. line, leads 357 and 435 across the now closed contact C70, lead 436, lead 361 (continued on FIGURE 12) to the field coil 109' and thence by leads 360 and 437 across closed contact C72 and by leads 438 and 362 to the other conductor 363 of the 110 volt A.C. power line. The winding of motor 109 will be in the following circuit: From conductor 356 of the 110 volt A.C. line by leads 357 and 439 across contact C74 to leads 440 and 368 (continued on FIGURE 12) to the motor winding and then by leads 369 and 441 across contact C76 and by leads 442 and 362 to the other conductor 363 of the 110 volt A.C. line.

It will be observed that the polarity of field coil 109' of worm positioning motor 109 is now reversed with respect to that obtained when relay R4 was energized as discussed above under the heading "Drive Controlling Circuits—Worm Initially in Engaged Position."

In FIGURE 14, the start of operation of motor 109 is indicated by the rise 109*e* in the horizontal line indicating the action of that motor. The legend "Engage" associated with the rise 109*e* indicates that the motor is so operating that worm 166 moves toward engagement with worm wheel 56.

As soon as motor 109 has moved carrier 100 and worm 166 inward from fully disengaged position with respect to worm wheel 56, the plunger 22 of full disengaged switch 226 will strike the stop 218 of FIGURES 6 and 12 so that the plunger of the switch will move inwardly with respect to its casing, thereby moving the plunger carried contact out of engagement with the fixed contacts 226A and 226A'. As a result, the circuit described above through the coil of relay R2 will be broken so that the contact C21 of this relay may move to closed position. However, the preceding energization of worm drive motor controlling relay R7 will have opened its normally closed contact C71. No circuit can be closed through the coil of relay R4 unless contact C71 is closed. It will be observed that relay R4 cannot be energized unless relay R7 is de-energized and its contact C43 is thereby closed. In other words, the relays R4 and R7 which respectively control drive of motor 109 in one direction or the other, are interlocked against concurrent energization.

Referring to FIGURE 14, the just-mentioned opening of the full disengagement switch 226 is indicated by the drop 226*d* in the horizontal line indicating the action of that switch. The simultaneous de-energization of relay R2 is indicated by the drop R2*d* in the line indicating the action of the relay. These actions will occur only an instant after automatic homing condition begins.

To summarize with regard to the results of the actions described in the present section of the specifications, drum 38 is stationary, the worm drive motor 104 is now rotating worm 166 through magnetic clutch 186, and the worm positioning motor 109 is rotating threaded shaft 212 in such direction that spring 107 can swing carrier plate 100 and worm 166 from fully disengaged position toward loosely engaged position with worm wheel 56 of drum 38. Switch 226 is now open and the switches 228, 234, 244 and 248 are in the position indicated in FIGURE 12. The relays R3, R5, R7 and R9 are energized.

As is indicated in FIGURE 14, by the lowered section 44*n* in the line indicating the position of brake 44, the brake on the drum shaft 37A is now engaged to retard rotation of the drum shaft and drum. The purpose of having the brake thus applied is to prevent the chattering which might occur during the driving of the drum which will occur when worm 166 now comes into loose engagement with worm wheel 56. It will be understood that brake 44 does not exert sufficient pressure upon shaft 37A to prevent its rotation by worm 166.

*Drive Controlling Circuits—Recording—Automatic Homing—Loose Engagement*

This stage of the automatic homing involves the action in the circuits of FIGURES 12 and 13 which occur when the worm 166 reaches loosely engaged position with worm wheel 56. Generally speaking, these actions involve stopping further movement of worm 116 toward the worm wheel 56, leaving the two loosely engaged so that motor 104 can rotate the drum at a speed of the order of one r.p.m. toward homed position.

When the carrier 100 and worm 166 have been moved into loosely engaged position with worm wheel 56, the plunger 224 of loose engagement switch 228 will strike the stop 220 so that the contact 224′ carried by plunger 228 will move out of engagement with fixed contact 228B and into engagement with fixed contact 228A. As a result, the circuit described above through the coil of relay R7 will be opened and worm positioning motor 109 will stop operation. Referring to FIGURE 14, this action is indicated beneath the arrow associated with the legend "Loose Engagement Position," the movement of switch 228 with its engagement with contact 228B to its contact 228A being indicated by the rise 228C. The de-energization of relay R7 occurring at the same instant is designated by the drop R7*d* in the line indicating the action of that relay, and the stopping of motor 109 is indicated by the drop 109*d* in the line associated with that motor.

With worm 166 in loose engagement with the worm wheel 56, the intermeshing relationship between the two will be such that worm 166 can drive the drum continuously at a speed which, while relatively slow with respect to the rotation resulting from motor 36, will nevertheless be substantially faster than the step-by-step drive of the drum subsequently described in detail.

With the worm 166 now engaged in loose driving relationship with the worm wheel 56, and the worm rotated by motor 104 through magnetic clutch 186, the drum will rotate by continuous movement in a predetermined direction, for example in the direction of the arrow A associated with the fragment of drum 38 shown in FIGURE 12. Such rotation will continue until the pin 240 projecting from one radial face of drum 38 contacts with the roller 242 carried on the free end of the pivoted arm 243 of coarse homing switch 244 which is mounted upon carrier plate 100. The switch arm 243 is normally in engagement with a fixed stop 244B.

*Drive Controlling Circuits—Recording—Automatic Homing—Coarse Homing*

When the drum rotating at one r.p.m., brings pin 240 into contact with roller 242 to swing arm 243, the latter will be moved into engagement with a fixed contact 244A. This engagement of pin 240 with roller 242 results in "coarse homing," viz., the starting point on the drum for the location of all data thereon is now almost in alignment with the erasing and recording magnets 60.

Obviously, if the pin 240 on drum 38 moved past switch 244 immediately before the start of the automatic homing action, the drum will have to rotate substantially one complete revolution before pin 240 again moves adjacent switch 244 as shown in FIGURE 12.

When switch 244 is closed by movement of its arm or blade 243 against fixed contact 244A, the circuits of FIGURES 12 and 13 will be actuated to de-energize the pawl throw-out magnet 194 so that pawl 150 will engage ratchet wheel 154. In addition, magnetic clutch 186 will be de-energized so that motor 104 cannot drive worm 166 through the clutch. In addition, relay R7 will be energized so that current will again be supplied to the worm positioning motor 109 to move its threaded shaft 212 away from carrier plate lug 236 (FIGURE 6) so that spring 107 can move carrier 100 and worm 166 toward tight engagement with the worm wheel 56. The initial circuit through coarse homing switch whereby the above actions are effected is as follows: From conductor 304 of the 60 volt D.C. line by lead 400, closed contact C30, lead 401, blade OS3, contact 393, leads 402, 410, contact C81, leads 411, 425, and 445, blade 243, fixed contact 244A, lead 446 (continued on FIGURE 13), contact C83 of non-energized relay R8, leads 447 and 448, closed contact C41 of non-energized relay R4 and lead 449 through the coil of relay R6, and then by lead 450 to the other conductor 315 of the 60 volt D.C. line.

The energization of relay R6 will break the circuit through the coil of relay R9 which has been described above as being closed under the sub-heading "Automatic Homing—Full Disengagement." The resultant opening of the contact C90 of relay R9 will de-energize magnet 194 so that pawl 150 will engage ratchet wheel 154. The opening of contact C92 will de-energize magnetic clutch 186 so that motor 104 will not drive the worm 166 through this clutch. Because motor 104 is still powered, it will continue to rotate the shaft 184 as well as the shaft 112. However, because the one revolution clutch 116 is disengaged, shaft 122 will not be rotated nor will the worm 166 be rotated from that shaft.

Referring to FIGURE 14, the closing of coarse homing switch 244, which is only momentary and during the passage of pin 240 against the roller 242 on the switch blade or arm 243, is indicated by the rise 244*r* on the line indicating the action of switch 244. The energization of relay R6 is indicated by the rise R6*e*, the de-energization of relay R9 is indicated by the drop R9*d*, the release of the pawl throw-out 194 and the disengagement of clutch 186 are respectively indicated by the drops 194*d* and 186*d* in the lines corresponding to those elements.

The energization of relay R6 will close a holding circuit through the contact C60 so that relay R6 will be held closed despite the almost immediate opening of switch 244. This holding circuit is as follows: From conductor 304, lead 400, contact C30, switch blade OS3, leads 402, 410 and 460, closed contact C60 of relay R6, leads 461 and 448, contact C41 of non-energized relay R4, lead 449, the coil of relay R6, and lead 450 to conductor 315.

The energization of relay R6 and the above-mentioned resultant closing of its normally open contact C62 will close the following circuit through the relay R7 which controls the driving of worm positioning motor 109 to permit movement of the worm toward the drum. This circuit is as follows: From the conductor 304 of the 60 volt D.C. line, lead 400, contact C30, switch OS3, leads 402 and 410, contact C81 of non-energized relay R8, leads 411 and 425, closed contact C62 of energized relay R6, leads 451 and 427 (continued on FIGURE 12) to movable contact 212' and fixed contact 234B of tight engagement switch 234, lead 428 (continued on FIGURE 13) closed contact C43 of non-energized relay R4, lead 429 through the coil of relay R7 and thence by lead 430 to the other conductor 315 of the 60 volt D.C. line.

The energization of relay R7 will cause worm positioning motor 109 to be driven by means of the motor circuits described above under the sub-heading "Automatic Homing—Full Disengagement" so that worm 166 will be moved from loosely engaged position with worm wheel 56 and toward tightly engaged position.

Referring to FIGURE 14, the energization of relay R7 is indicated by the rise R7*f* in the line indicating the action of that relay. The powering of motor 109 is designated by the rise 109*f* in the line indicating the action of that motor. The legend "Eng." indicates that the motor is rotating in the direction to enable spring 107 to swing worm 166 toward worm wheel 56. Obviously, such swinging movement will require only a moment because tight engagement will occur when worm 166 swings a few thousandths of an inch.

It will be observed that energization of relay R6 will set up a circuit through the coil of worm positioning motor controlling relay R7, the new circuit through normally open contact C62 relay R6 being independent of loose engagement switch 228. (The previous circuit to relay R7 during the full disengagement stage was through normally closed contact C63.) Also, energization of relay R6 has de-energized relay R9. Hence, relay R6 is an over-riding relay for both the worm positioning motor controlling relay R7 and the clutch and pawl throw-out controlling relay R9.

*Drive Controlling Circuits—Recording—Automatic Homing—Tight Engagement Position*

When worm positioning motor 109 rotates threaded shaft 212 slightly beyond the position necessary to enable spring 107 to draw worm 166 into tight engagement with worm wheel 56, the plate 230 fixed to shaft 212 (FIGURE 6) will move into engagement with the plunger 232 of tight engagement switch 234. Hence, plunger 232 will be pushed upwardly in its casing fixed to the stationary base of the apparatus.

This upward movement of the plunger 232 will cause contact 212' fixed to the plunger, to move out of engagement with fixed contact 234B and into engagement with fixed contact 234A. Therefore, the circuit through the coil of relay R7 which was closed at coarse engagement as described just above under the sub-heading "Automatic Homing—Coarse Engagement" will be broken, so that the power circuit to worm positioning motor 109 will be broken. Bearing in mind that the movable contact 212' of switch 234 is connected to conductor 304 of the 60 volt D.C. line through closed contact C62 of energized relay R60, closed contact C81 of non-energized relay R8, through switch blade OS3 and the closed contact C30 of relay R3, the engagement of movable contact 212' with fixed contact 234A will complete the following circuit beginning with contact 234A: Lead 465 to the blade of homing completion switch 248, the fixed contact 248B with which the blade is engaged, and then by a lead 466 to a pulsing device 467, then by a lead 468 to the magnet 118 which trips the one revolution clutch 116 and by leads 469 and 415 to the other conductor 315 of the 60 volt D.C. line.

The pulsing device 467 includes a circuit making and breaking device driven from a source 467*a* of synchronized current; for example, a sixty cycle source. The circuit maker and breaker will periodically close the circuit path just described. Each time the clutch trip is actuated, shaft 122 will be rotated for one full rotation and then be disengaged from shaft 112. Each rotation of shaft 122 will correspondingly rotate cam 124 to cause pawl 150 to advance ratchet wheel 154 by a distance corresponding to the distance between adjacent teeth of the ratchet wheel. The ratchet wheel preferably will be provided with about ten teeth so that the resultant rotation of shaft 146 to which worm 166 is fixed will be a correspondingly short rotational movement. This rotational movement will, of course, be transmitted to the worm 56 so that the drum will now be advanced step-by-step by very slight increments toward homed position. Bearing in mind that the data receiving cells on the drum tracks may be spaced on centers one-fiftieth of an inch apart, the worm will rotate drum 38 by that distance on each driving movement of pawl 150.

Referring to FIGURE 14, the movement of switch 234 from engagement with contact of 234B and into engagement with contact 234A is indicated by the rise 234*e* in the line indicating the action of that switch and which rise is beneath the legend "Tight Eng. Position." The simultaneous de-energization of relay R7 is indicated by the drop R7*g* in the line associated with that relay, and the resultant stopping of worm positioning motor 109 is indicated by the drop 109*g* in the line indicating the action of that motor. The resultant transmission of pulses to the trip magnet 118 is illustrated in the line indicating the action of the trip magnet 118 by the rise 118*e*. It will be understood that this line should include a number of rises corresponding to the number of pulses of current which occur before homing is completed.

*Drive Controlling Circuits—Recording—Automatic Homing—Homing Complete*

When the ratchet wheel 154 has been rotated sufficiently far to bring the rise 163 on cam 162 (illustrated in FIGURE 7 and diagrammattically in FIGURE 12) against the homing completion switch 248, the blade 246 of that switch will be momentarily moved from its fixed contact 248B into engagement with its fixed contact 248A. Ratchet wheel 154 has only ten teeth and, therefore, not more than ten pulses will be required from pulsing device 467 to move drum 38 from coarse homed position to homing complete position.

Bearing in mind that the blade 246 of switch 248 is connected to the conductor 304 of the 60 volt D.C. line by the circuit described above as having been closed through contact 234A of tight engagement switch when tight engagement occurred, and as described above under the heading "Automatic Homing—Tight Engagement," the contact of blade 246 of switch 248 with fixed contact 248A will complete the following circuit extending downwardly in FIGURE 12 from contact 248A: By lead 475 (continued on FIGURE 13), through the coil of relay R8 and then by lead 476 to the other conductor 315 of the 60 volt D.C. line.

The energization of relay R8 will cause the following circuit to be closed through its contact C82 to energize the brake magnet 44*c* to thereby cause brake 44 to be disengaged from the drum shaft 37*a*: From conductor 326 of the 110 volt D.C. line by lead 478 (continued on FIGURE 13) through the now closed contact C82, lead 479 (continued on FIGURE 12), lead 329, magnet 44*c* and by lead 330 to the other conductor 331 of the 110 volt D.C. line. Because worm 166 is now tightly engaged with worm wheel 56, there is no necessity of having the brake applied to prevent chattering between the worm and the worm wheel.

The energization of relay R8 causes its contact C81 to open, thereby locking out the pulsing circuit which passed through this contact.

Referring to FIGURE 14, the above momentary engagement of homing completion switch 248 is (under the legend "Homing Complete") indicated by the rise 248*a* in the line illustrating the action of that switch. The rise R8*e* in the line associated with relay R8 designates the energization of that relay and the rise 44*h* in the line associated with brake 44 indicates that the brake is now off.

The energization of relay R8 sets up a holding circuit through contact C80 of that relay. This circuit is as follows: From conductor 304, lead 400, contact C30 of relay R3, switch blade OS3, contact 393, leads 402, 410 and 487, closed contact C80, lead 486, contact 383 engaged by blade CS3 of condition selector switch CS, through the blade and by leads 485 and 475 through the coil of relay R8 and thence by lead 476 to the other conductor 315 of the 60 volt D.C. line.

It will be noted that when contact C81 of relay R8 is opened, the pulsing device 467 becomes inoperative, and relays R7 and R9 cannot be energized.

When the rise 163 of cam 162 actuates the homing completion switch 248 as described above, the drum 38 is at homed position with respect to the magnets so that any desired data on the drum can now be located. Also, as is hereinafter explained under the section entitled "Magnet Controlling Circuits—Recording," the drum can be recorded upon at any desired and accurately located point. Actuation of switch 248 will break the circuit through pulsing device 467 which has been relied upon to move the drum step-by-step to homed position. However, as is hereinafter described, pulses can be supplied to the trip magnet 118 from a tape reader to advance the drum step-by-step during recording or alteration of data thereon, as well as to locate any desired data on the drum for slow speed reading or alteration.

In other words, by the automatic homing operation, the circuits of FIGURES 12 and 13 have brought drum 38, first by slow continuous movement, and then by a step-by-step movement, to homing or starting position with respect to the magnets 60 used for slow speed recording. Other circuits, hereinafter described under "Magnet Controlling Circuits" will now be used to apply data to the drum, or alter such data. These other circuits will also take over the control of the elements of FIGURES 12 and 13 (primarily the one rotation clutch 116 and pawl and ratchet 150—154) which will drive the drum. Because motor 104 is still powered, the shaft 112 which will serve as the driving shaft of one revolution clutch 116 will be rotating to supply drive to pawl 150 when clutch 116 is tripped by the other circuits hereinafter described.

Referring to FIGURE 14, the arrival of the drum at homed position is designated by the character C at the right-hand end of the line A, B, C below the figure. This line indicates the duration of the automatic homing operation. As is indicated by the vertical legend to the right of the character C, recording may now be performed.

It will be noted that at the end of the automatic homing operation, relay R5 is still energized to power worm drive motor 104, relay R8 is still energized to hold brake 44 off, and relays R3 and R6 are energized to maintain R5 and R8 energized. These four relays will remain energized during operations with regard to the drum data and until either of the switches OS or CS are moved to some other position.

*Drive Controlling Circuits—Recording—Recycling—Tight Engagement*

After automatic homing has been carried out, and operations with regard to the data on the drum are being conducted, it may be desired to again move the drum to homed position as quickly as possible. In such case, the following series of operations termed "Recycling" will be performed by the elements of FIGURES 12 and 13 to restore the drum to homed position. Because the worm 166 and worm wheel 56 are in tight engagement, this stage is termed "Tight Engagement."

It will be borne in mind that Operation Selector switch OS will still be in recording position, and Condition Selector switch CS will be in automatic homing position.

The central portion of FIGURE 14, above the bottom legend "Recycle Condition," indicates the actions which occur during recycling. The horizontal line associated with the just-mentioned legend indicates the duration of these actions. By reading vertically of the figure and in alignment with the top legend "Tight Engagement" and the letter "D" at the bottom of the figure, it will be observed that switches 226 and 244 are open, switch 228 is engaged with 228A, switch 234 is engaged with contact 234A, and switch 248 is engaged with contact 248B, and the relays R3, R5, R6 and R8 are energized.

To initiate the recycling operation, the Condition Selector switch CS will be operated to bring its blades CS1, CS2 and CS3, respectively, into engagement with the fixed contacts 491, 492 and 493, viz., the "recycle" contacts. It will be recalled from the above discussion of the homing completion stage of automatic homing (under the subheading "Automatic Homing—Homing Complete") that one of the actions during that stage was the setting up of a holding circuit through the coil of relay R8 and its contact C80. When the contact blade CS3 of Condition Selector switch CS is moved from automatic homing contact 383 to "Recycle" contact 493, this holding circuit will be broken. Hence R8 will be de-energized, and brake 44 will be applied. However, the circuit through the delayed closing relay R3 will be maintained because the position of blade OS2 of Operation Selector switch OS is not changed. Therefore, the contact C30 of relay R3 will remain closed to hold R5 energized.

Another result of moving the switch CS from "Automatic Homing" to "Recycle" will be the closing of a circuit via its blade CS1, through the coil of relay R4, this circuit being as follows: From conductor 304 of the 60 volt D.C. line by leads 305 and 345, blade OS2, contact 392, lead 395, contact 491, blade CS1, lead 347 (continued on FIGURE 13) lead 348, contact C21 of non-energized relay R2, lead 349, contact C71 of non-energized relay R7, lead 350, the coil of relay R4, and thence by lead 351 to the other conductor 315 of the 60 volt D.C. line.

Energization of relay R4 will open its contact C41 to thereby break the holding circuit through relay R6 which was closed at the coarse homing position during automatic homing. The energization of relay R4 will also open contact C43 thereof which is in series with the coil of relay R7 to lock out that relay.

In addition, energization of relay R4 will cause worm positioning motor 109 to be powered to rotate in such direction that worm 166 will be moved out of engagement with worm wheel 56. One of the two circuits through motor 109 will be as follows: From conductor 356 of the 110 volt A.C. line by leads 356 and 358, across contact C42, by leads 359 and 360 to the field coil 109' of motor 109, lead 361 to contact C44 and then by lead 362 to the other conductor 363 of the 110 volt A.C. line. The other circuit through the motor is as follows: From conductor 356 of the 110 volt A.C. line by leads 357 and 366, contact C46, leads 367 and 368 to the winding of motor 109, then by leads 369 and 370, contact C48, leads 371 and 362 to the other conductor 363 of the 110 volt A.C. line.

Energization of relay R4 will also set up a holding circuit through that relay as follows: From conductor 304 of the 60 volt D.C. line by lead 351*a*, contact C40, leads 352 and 348, contact C21 of non-energized relay R2, lead 349, contact C71 of non-energized relay R7, lead 350, the coil of relay R4 and lead 351 to the conductor 315 of the 60 volt D.C. line.

A further result of the de-energization of relay R8 and the de-energization of relay R6 will be the closing of the circuit through the coil of relay R9 which controls the pawl throw-out 194 and clutch 186. The circuit through the coil of relay R9 is identical with the circuit therethrough described above under the sub-heading "Automatic Homing—Full Disengagement." As a result, the contacts C90 and C92 will be closed to set up a circuit through magnet 194 to cause pawl 150 to be moved out of engagement with ratchet wheel 154 and a second circuit will be set up through the magnetic clutch 186 to cause that clutch to be engaged so that worm driving motor 104 will now drive the worm 166 by continuous rotation through magnetic clutch 186.

Referring to FIGURE 14, the above-discussed actions in connection with recycling are indicated under the heading "Move Switch CS to Recycle." In more detail, de-energization of relays R8 and R6 is indicated in the lines illustrating the action of those relays by the respective drops R8*f* and R6*f*. Energization of relay R4 is indicated by the rise R4*e* in the line corresponding to that relay. The rise R9*f* in the line indicating the action of relay R9 designates the energization of that relay. Referring to the line associated with motor 109, the rise 109*h* and the notation "Disengage" indicates that the motor is now turning to move the worm 166 to disengaged position with respect to worm wheel 56. The operation of magnet 194 to throw out pawl 150 is indicated by the drop 44*j*. Energization of clutch 186 is designated by the rise 186*f*.

Motor 109 will rotate threaded shaft 212 in such direction that it will move downwardly (as viewed in FIGURE 6) through fixed lug 214 to thereby exert pressure on carrier plate lug 236. Hence, the carrier plate 100 and worm 166 will move away from worm wheel 56 against the action of spring 107.

*Drive Controlling Circuits—Recording Recycle—Full Disengagement*

When the worm positioning motor 109 has moved carrier 100 and worm 166 into fully disengaged position with respect to worm wheel 56, full disengagement switch 226, which until now has been opened, will close. This action is indicated in FIGURE 14 under the legend "Full Disengagement" in the line associated with switch 226 and by the rise 226*e*. When switch 226 thus closes, the following circuit will be closed: From conductor 304 of the 60 volt D.C. line by lead 305, switch 226, lead 306, the coil of relay R2 and by lead 318 to the other conductor 315 of the 60 volt D.C. line. Energization of relay R2 will open its contacts C21, which contact is in the holding circuit through relay R4. Relay R4 will thereby be de-energized so that its contacts will open and no power will be supplied to the worm positioning motor 109. Therefore, movement of worm 166 away from worm wheel 56 will stop. Energization of relay R2 is indicated in FIGURE 14 by the rise R2*e*. De-energization of relay R4 is indicated by the drop R4*f* in the line corresponding to that relay. The stopping of motor 109 is indicated by the drop 109*j*.

When relay R4 is de-energized, the closing of its contact C43 will set up the following circuit through the other worm positioning motor controlling relay R7: From conductor 315 of the 60 volt D.C. line by lead 430, through the coil of relay R7, lead 429, contact C43 of non-energized relay R4, lead 428, contact 234B of tight engagement switch 234 and the movable contact 212' of that switch, lead 427 (continued on FIGURE 13), contact C61 of non-energized relay R6, lead 426 (continued on FIGURE 12) to fixed contact 228B and movable contact 224' of loose engagement switch 228, lead 425, lead 411, contact C81 of non-energized relay R8, leads 410 and 402, contact 393 and blade OS3 of switch OS, lead 401, contact C30 of energized relay R3 and lead 400 to the other conductor 304 of the 60 volt D.C. line.

The circuit described in the preceding paragraph will result in worm positioning motor 109 being powered to rotate threaded shaft 212 oppositely to the direction in which it has been rotating and so that spring 107 can swing carrier 100 and worm 166 from full disengagement position and toward the worm wheel 56 in the same manner as was described above under the sub-heading "Automatic Homing—Full Disengagement."

In conducting recycling, as soon as full disengagement position has been reached, the operator should move switch CS from "Recycle" position to "Auto. Homing" position. With this done, all of the elements of FIGURES 12 and 13 will now be in the same position they occupied in the full disengagement position of automatic homing. Therefore, the elements of FIGURES 12 and 13 will now repeat the same operations which have been set forth above with regard to automatic homing and beginning with the section entitled "Drive Controlling Circuits—Recording—Automatic Homing—Full Disengagement."

The full disengagement switch 226 will open as soon as carrier 100 and worm 166 move out of full disengagement position, and relay R2 will be de-energized at the same instant. These actions are indicated in FIGURE 14 by the characters 226*f* and R2*f*, respectively. The de-energization of relay R4 and the energization of R7 which occur at full disengagement position are respectively indicated by the drop R4*f* and the rise R7*j* in the lines indicating the action of those relays. The rise 109*k* and the legend "Engage" in the line corresponding to motor 109 indicates that at full disengagement position the motor begins operation to move worm 166 toward the drum.

Still referring to FIGURE 14, it indicates the repetition of the automatic homing actions by the vertically extending legend "Repeat B to C of Automatic Homing." In other words, the elements of FIGURES 12 and 13 will go through loose engagement position, coarse home position, tight engagement position and homing completion position.

To summarize with regard to the recycle condition it enables the drum 38 to be restored to homed position at a time when the drum is being driven step-by-step by tight engagement of the worm 166 with worm wheel 56. It will be recalled that in the initial stage of automatic homing, worm 166 was fully disengaged from worm wheel 56. In effect, recycling involves first moving worm 166 out of engagement with the worm wheel 56 and then performing all of the operations of automatic homing to bring the worm back into tight engagement with the worm wheel 56 and rotate the drum to homed position.

*Drive Controlling Circuits—Recording—Non-Homed—Disengagement*

The purpose of the "Non-Homed" condition is to bring worm 166 into tight engagement with worm wheel 56, but without moving drum 38 to homed position. This condition can be obtained if switch CS is in either "Automatic Homing" position or "Recycle" position provided switch CS is moved to "Non-Homed" position before loose engagement of the worm 116 with the worm wheel 56 occurs. However, the following discussion and the chart of operations relative to "Non-Homed" condition in FIGURE 14 assume that, with switch OS in "Erase" position, switch CS has been moved to "Non-Homed" position and switch OS then moved to "Recording" position.

Assuming that the blades CS1, CS2 and CS3 of Condition Selector switch CS are respectively in engagement with the "Non-Homed" contacts 501, 502, and 503 and that Operation Selector switch is now moved from "Erase" to "Recording" position, the relays R3, R5, R7, and R9 will be energized through the same paths as have been discussed above under the heading "Automatic Homing—Full Disengagement." The only difference between the present circuit paths and those under the heading just mentioned will be that the fixed contact 503 of switch blade CS3 is connected to lead 486 by a lead 486' which is in parallel with the connection of lead 486 to the "Auto. Homing" contact 383. As a result, worm drive motor 104 will begin rotation of worm 166 through clutch 186, pawl 150 will be disengaged, and the worm positioning motor 109 will rotate threaded shaft 212 in the direction to enable spring 107 to move worm 166 toward the drum worm wheel 56, all as described above under the sub-heading "Automatic Homing—Full Disengagement."

Referring to FIGURE 14 and, more particularly, to the legend "Full Disengagement" associated with the portion of the figure entitled "Non-Homed Condition," it will be observed that the action of the switches, relays and other elements at full disengagement of non-homed condition is the same as occurred at "Full Disengagement" during "Automatic Homing Condition." These various actions are indicated by the rises or dwells 226*g*, R2*g*, C30″, R5*f*, R7*k*, R9*g*, 104*f*, 109*m*, 194*g*, and 186*g* in the horizontal lines indicating the action of the various elements.

To summarize, worm 166 is now moving from full disengagement position toward loose engagement position and is being rotated continuously by motor 104. Because worm 166 is not yet in engagement with worm wheel 56, drum 38 is stationary.

*Non-Homed Condition—Loose Engagement*

When worm positioning motor 109 has moved worm 166 into loose engagement with worm wheel 56, the plunger 224 of switch 228 will strike the stop 220 so that the plunger carried contact 224′ will be moved from engagement with fixed contact 228B to engagement with fixed contact 228A. This will break the circuit which has been holding relay R7 energized. However, another circuit is immediately set up through relay R7 when contact 224′ of switch 228 engages fixed contact 228A. Hence, the interruption of the operation of worm positioning motor 109 will be almost imperceptible.

The new circuit through relay R7 will be set up by the energization of relay R6. The circuit energizing relay R6 is from conductor 304 of the 60 volt D.C. line, lead 400, contact C30 of energized relay R3, lead 401, switch blade OS3, contact 393, leads 402 and 410, contact C81 of non-energized relay R8, leads 411 and 425 to movable contact 224′ of switch 228, fixed contact 228A, lead 510 to the fixed contact 502, switch blade CS2, lead 446, contact C83 of non-energized relay R8, leads 447 and 448, contact C41 of non-energized relay R4, lead 449 to the coil of relay R6 and thence by lead 450 to the other conductor 315 of the 60 volt D.C. line. The energization of relay R6 will set up a holding circuit through relay R6 as follows: From conductor 305 of the 60 volt D.C. line by lead 400 through contact C30 of energized relay R3, lead 401, switch blade OS3, contact 393, leads 402, 410, and 460, contact C60 of relay R6, leads 461 and 448, contact C41 of relay R4, lead 449, the coil of relay R6 and lead 450 to the other conductor 315 of the 60 volt D.C. line.

The energization of relay R6 will close a circuit through relay R7 as follows: From conductor 304 of 60 volt D.C. line by lead 400, contact C30, lead 401, switch blade OS3, contact 393, leads 402 and 410, contact C81 of non-energized relay R8, lead 411 and 425, contact C62 of energized relay R6, leads 451 and 427 to movable contact 212′ of switch 234, contact 234B, lead 428, contact C43 of non-energized relay R4, lead 429, coil of relay R7, and lead 430 to conductor 315 from the 60 volt D.C. line.

Referring to FIGURE 14, the actions which occur at loose engagement are indicated under the legend "Loose Eng. Position." The engagement of movable contact 224′ of switch 228 with contact 228A is indicated in the line indicating the action of switch 228. The energization of relay R6 is indicated by the rise R6*g*, the momentary de-energization of relay R7 is indicated by the dwell R7*m* and the pause in the rotation of motor 109 by the dwell 109*n*.

Another result of the energization of relay R6 will be the de-energization of relay R9 which occurs by the opening of the contact C63 of relay R6. De-energization of relay R9 will result in magnet 194 being de-energized so that pawl 150 will re-engage the ratchet wheel 154, and clutch 186 will be disengaged. As a result, with the rotation of worm driving motor 104 still continuing as started during "Non-Homing—Full Disengagement" a drive to worm 166 is now possible through pawl 150 and ratchet wheel 154.

Referring to FIGURE 14, the de-energization of relay R9 is indicated by the drop R9*h*, the de-energization of magnet 194 is indicated by the drop 194*h*, and the disengagement of clutch 186 is indicated by the drop 186*h*.

*Non-Homed Condition—Tight Engagement*

With motor 109 still rotating to permit spring 107 to move worm 166 toward the drum from loose engagement position, the worm will now come into tight engagement with worm wheel 56. When tight engagement is reached, the contact 212′ carried by plunger 232 will move into engagement with fixed contact 234A. When the contact 212′ of tight engagement switch 234 moves from contact 234B as described above, the circuit through the coil of relay R7 which controls the worm positioning motor 109 will be broken so that the circuits through its contacts to the motor 109 will likewise be broken. Hence, worm 166 will stop its inward movement in tight engagement with worm wheel 56. Referring to FIGURE 14, the de-energization of relay R7 is indicated by the drop R7*n* and the stop of motor 109 is indicated by the drop 109*p*.

Also, the following circuit through the pulsing device 467 will be set up: From conductor 304 of the 60 volt D.C. line by lead 400, contact C30, lead 401, blade OS3, contact 393, leads 402 and 410, contact C81, leads 411 and 425, contact C62 of energized relay R6, lead 451, lead 427 to movable contact 212′ of switch 234, contact 234A, lead 465, the blade of homing complete switch 248, contact 248B, lead 466, pulsing device 467, lead 468, magnet 118, leads 469 and 415 to the other conductor 315 of the 60 volt D.C. line.

The pulsing device 467 will now periodically provide a current flow through the circuit just described so that magnet 118 will trip the one revolution clutch 116. Shaft 122 and its cam 124 will thereby be rotated, one rotation at a time, to actuate pawl 150 so as to rotate ratchet wheel 154 and worm 166 step-by-step to advance drum 38. This action has ben discussed above under the sub-heading "Automatic Homing—Coarse Homing Position." Such step-by-step rotation will continue until the rise 163 on cam 162 trips switch 248 to move the blade of the switch from contact 248B, thereby breaking the circuit through the pulsing device 467, and moving the blade into engagement with contact 248A. The circuit now closed will include the coil of relay R8, being the same as described through that coil under the sub-heading "Automatic Homing—Homing Complete." Hence, the contacts of relay R8 will close a circuit extending through the brake magnet 44*c* so that brake 44 is now released.

Referring to FIGURE 14, under the top legend "Tight Eng. Position," the engagement of the blade of switch 248 with contact 248A is indicated by the rise 248*aa* in the line associated with switch 248. The energization of relay R8 is indicated by the rise R8*g* and the energization of magnet 44*c* to release brake 44 is indicated by the rise 44*k*.

As is clear from FIGURE 14, the actuation of the homing completion switch 248 may occur a short time after rotation of ratchet wheel 154 by pawl 150 starts. However, while the duration of this rotation cannot continue for a longer period of time than it requires ratchet 154 and cam 162 to make a complete rotation, nevertheless, if rise 163 of cam 162 is in a position closely approaching the blade of switch 248 when the pawl driven rotation starts, operation of switch 248 may take place almost simultaneously with the movement of worm 166 into tight engagement position.

It will be observed that at the end of the non-homed condition, worm 166 will be in tight engagement with worm wheel 56 and in readiness to transmit step-by-step drive to the drum. However, the starting or homing point of drum 38 will not be in alignment with the magnets 62. This is the principal difference between establishing a step-by-step drive for the drum by the non-homed condition instead of either by the automatic homing condition or the recycle condition.

With non-homed condition completed, the drum can be recorded upon or data thereon may be altered during step-by-step rotation of the drum. Circuits then used in recording upon the drum as well as for other operations with respect to the data upon the drum are discussed immediately below.

MAGNET CONTROLLING CIRCUITS

*Erasing*

FIGURE 15 diagrammatically illustrates the circuits for connecting the recording and erasing magnets 60 with a source of recording voltage during step-by-step movement of drum 38, as well as for connecting the same magnets with erasing voltage.

In the right-hand portion of FIGURE 15, a fragment of drum 38 is illustrated together with a number of groups of the magnets associated with the drum, each group comprising a rewriting or altering magnet 68, a recording or erasing magnet 60 and a reading magnet 62. It will be observed that each recording and erasing magnet 60 has a lead 540 extending therefrom and through a plug board fixed on the base of the machine to one of a series of pivoted switch blades 541. The switch blades 541 of the respective leads 540 are adapted to be operated in unison by a gang connection shown in dotted lines and forming part of a switch 542. By means of switch 542, each lead 540 can be connected either to a fixed contact 543 or a fixed contact 544. The contacts 544 are each connected by leads 545 to a common conductor 546 connected to a source of erasing voltage. Hence, whenever it is desired to erase data from the drum, the switch 542 will be operated to connect the magnets 60 to the erasing voltage to erase any matter on the corresponding tracks or tapes of drum 38.

It is usually desirable to first erase all information which has been placed on a track before any entirely new information is to be recorded thereon. Even if a track supposedly bears no data or signals, it will be desirable to subject it to an erasing operation before new data is recorded on the track. It will be obvious that this can be done by rotating drum 38 continuously at high speed by motor 36 and while the magnet 60 corresponding to the track is connected to the source of erasing voltage.

It will be understood that the contact blades 541 need not be simultaneously operated; in other words, if it is desired, the blade may be independently operated so that one track can be erased independently of others.

*Magnet Controlling Circuits—Recording*

Still referring to FIGURE 15, it will be observed that the fixed contact 543 associated with each switch blade 541 and recording and erasing magnet 60 has a lead 547 extending therefrom to a teletype or other punched tape reader generally indicated by the numeral 548. At the reader 548, the respective leads 547 are connected to the movable contact 549 of corresponding relays 550. Each relay 550 includes a fixed contact 551 and a coil 552. Because the relays 550 are energized by the action of the punched tape sensing device described immediately below, these relays may be conveniently termed senser-operated relays. One end of the coil 552 of each relay 550 is connected by a lead 553 to a common conductor 554 connected to one side 555 of a coil operating circuit. The other end of each coil 552 is connected to one contact 556 of a pair 556—556*a* forming part of a punched tape sensing device 557 such as disclosed in Tholstrup Patent No. 2,378,371, issued June 12, 1945. The contact 556*a* of each sensing device is connected to a common lead 558 which extends to a fixed contact 559 forming part of a cam or other cyclically operated switch generally designated 560 and including a movable contact 561 operated by a cam 562 fixed to a rotatable shaft 563. The movable contact 561 is connected by a lead 564 to conductor 555*a*. Conductor 555*a* and the conductor 555 described above are the two conductors of a power line. Tape reader 548 also includes a second cam 565 fixed on shaft 563 and forming part of a second cam or other cyclically operated switch 566, this switch including a cam operated contact 567 and a fixed contact 568. The movable contact 567 is connected by a lead 569 to conductor 555*a*. As is hereinafter explained, the cams 562 and 565 are so designed that during each rotation of shaft 563 switch 565 will close before switch 566 and remain closed after switch 566 has opened.

The fixed contact 559 of the first-mentioned cam operated switch 560 is connected by leads 570 and 571 to one end of the coil of a relay 572, the other end of the coil being connected by a lead 573 to conductor 555. A fixed contact 574 forming part of relay 572 is connected by a lead 575 to one conductor of a source of writing or recording voltage of proper characteristics to apply to the drum tape signals having the magnetic value indicated in said Cohen et al. application Serial No. 16,998. For reasons hereinafter apparent, relay 572 may be termed a writing pulse starting relay while an additional relay 579 which will now be described may be termed a writing pulse cut-off relay. The cyclically operated switch 560 which controls relay 572 may be termed a writing pulse starting switch, while the cyclically operated switch 566 now to be described may be regarded as a writing pulse cut-off switch in that it controls cut-off relay 579. A movable contact 576 forming part of signal starting relay 574 is connected by a lead 577 to one movable contact 578 of the cut-off relay 579. Movable contact 578 is normally in engagement with a fixed contact 580 connected by a lead 581 to the fixed contacts 551 of all of the senser-operated relays 550. A second movable contact 582 of cut-off relay 579 is connected by lead 570 to the fixed contact 559 of the cyclically operated switch 560. The fixed contact 583 of cut-off relay 579 associated with movable contact 582 is connected by a lead 584 to the fixed contact 568 of the cyclically operated cut-off switch 566. The coil of cut-off relay 579 is in the lead 585 which extends from conductor 555 to lead 584 and the fixed contact 568 of cam operated cut-off switch 566.

The fixed contact 599 of the cyclically operated pulse starting switch 560 is connected by a lead 586 to the coil of a relay 587. This relay includes a fixed contact 588 connected by a lead 589 to one conductor of a 60 volt D.C. line, for example, the conductor 304 of FIGURE 13. The movable contact 590 of relay 587 is connected by a lead 591 to the magnet 118 which actuates the trip of the one revolution clutch 116 associated with shaft 112 of FIGURE 12. The coil of magnet 118 has its other side connected by a lead 592 to the other conductor of a 60 volt D.C. line, for example, the conductor 315 of FIGURE 13.

It will be perceived from the foregoing that the relay 587, when energized, will supply current to the magnet 118 in the same manner as the pulsing device 467 of FIGURE 12. Hence, relay 588 may be termed a driving pulse relay or pulsing device and controls the power to drive drum 38 step-by-step.

It will be noted that all contacts of all the relays shown in FIGURE 15 are normally open except the contacts 578 and 580 of cut-off relay 579 which are normally closed.

*Magnet Controlling Circuits—Recording Operation—FIGURE 15*

As has been indicated above, the magnet 60 associated with each track or tape of the drum will be used for both erasing and original recording, the reading magnet 62 will only be used for reading or analyzing data upon the drum, while the third magnet 58 of the group associated with each track will be used for high speed re-recording or for alteration of data already upon the drum.

The apparatus may be operated to provide entirely discrete signals even though the cells or areas to which signals are applied are spaced on a tape or track as closely together as two hundred to the inch. However, in order to obtain satisfactory results, including the ability to find every cell and its signal with the aid of a timing track such as described in said Cohen et al. application, care must be exercised to have every signal exactly and properly located in its storage cell or area. This can be done without difficulty if it is borne in mind that the matter of whether the drum is stationary or moving at high speed (for example, at 200 r.p.m.) will affect the point at which a signal for a given cell will be applied to that cell by a fixed magnet. It is because of this that separate magnets are used for step-by-step or slow speed recording and high speed recording. Thus, with a magnet 60 used for step-by-step recording positioned at a given point relative to a track, the magnet 58 used for high speed recording upon the same track will be so positioned that when the drum is rotating at high speed, the magnet 58 will impress a signal at the same point in any cell that the signal from magnet 60 would fall upon that cell. In more detail, referring to FIGURE 2, the gap of a magnet 58 will not be spaced from the gap of the magnet 60 for the same track by a distance exactly equal to a multiple of the distance betwen the centerpoints of two adjacent cells but, instead, the spacing of one gap from the other will be a given multiple of the cell spacing, plus a fraction of that cell spacing.

The foregoing explains why separate magnets are used for slow speed and high speed recording. Because the magnets 60 require no definite position with respect to data on the drum for their erasing function, these magnets are also assigned that function. The magnets 60 are properly positioned with regard to the homed position of the drum.

Data to be recorded upon the drum can be transmitted from a punched tape of well-known type and having the punched holes therein arranged in accordance with the desired code, for example, the Baudot code. When tape of this type is moved through the reader 548 by a tape moving mechanism of the type disclosed in the above-mentioned Tholstrup Patent No. 2,378,371, a sensing pin associated with each sensing device 557 will sense one row of holes in the tape. If a punched tape provided with seven rows of punched hole positions is to be used, the sensing contacts 556 will be grouped accordingly. Bearing in mind that the drum 38 may have a total of thirty-two tracks available for storage of data, it will store data from as many as four seven hole position teletype tapes, while signals to indicate the beginning and ending of information on the four tapes may be stored upon the other four tracks of the drum.

In the following description of the recording operation, it is assumed that the drum has been brought to homed position in the manner discussed above in the section entitled "Drive Controlling Circuits" and under the sub-heading "Automatic Homing" or the sub-heading "Recycle" so that worm 166 is now tightly engaged with worm wheel 58 to rotate the drum step-by-step. However, the magnet 118 for operating the one revolution clutch 116 which will power worm 166 has now been connected to the driving pulse controlling relay 587 of FIGURE 15 rather than to the pulsing device 467 of FIGURE 12 used to bring the drum to homed position.

After the punched tape has been moved (as described in said Tholstrup patent) to bring a line of hole positions into alignment with the top row of sensing devices 557 shown in FIGURE 15, the cam shaft 563 will be rotated through one revolution by a one revolution clutch as described in said patent.

Assuming that there is a code hole in the tape in alignment with the sensing device 550 shown at the left in the top row of FIGURE 15, the contacts 556 and **556*a*** will engage.

FIGURE 17 indicates the sequence of operations which will now occur, and the rise **557*e* in the line designated "Tape Sensing Device 557" indicates that the sensing contacts engage approximately four milliseconds after the tape stops its movement and when the shaft 563** has rotated approximately 20° from the position it occupied when the tape stopped.

As is indicated in FIGURE 17 at **560*e* in the line designated "Recording Pulse Starting Switch 560," the cyclically operated switch 560 will be closed by cam 562 when shaft 563 has rotated approximately 30°. When this switch closes, current will flow from conductor 555*a* through switch 560 and thence by lead 558 to the engaged contacts 556 and 556*a* of sensing device 557 and then through the coil 552 of senser operated relay 550 to lead 553 and conductor 555. Energization of the coil of senser operated relay 550 will move its contact 549 into engagement with its fixed contact 551. At the same instant that the contacts of relay 550 close, current will flow from cyclically operated switch 560 by lead 570 to energize the coil of signal producing relay 572, thereby causing its movable contact 576 to close. FIGURE 17 indicates the simultaneous closing of the contacts of the relays 550 and 572 by the rise 550*e*** in the line indicating the action of those relays.

As soon as the contacts of the relays 550 and 572 have closed, current will flow from the source of writing voltage through lead 575, the contacts of relay 572, by lead 577 through the normally closed contacts 578 and 580 of relay 579, then by lead 581 to the contacts of the senser operated relay 550 of the corresponding sensing device, and then by lead 547, switch blade 541, lead 540 to the corresponding magnet 60, and common lead 595 to the other conductor of the recording voltage, indicated in FIGURE 15 as a ground. Hence, application of a signal to the cell opposite magnet 60 starts. The drive of worm shaft 166 by pawl 150 will be so timed in relation to the rotation of the cam shaft 563 that, at this instant, the drum will be stationary as indicated by the flat portion at the left-hand end of the line in FIGURE 17 designated "Movement of Drum 38." The moment when recording of the signal or writing pulse begins is designated by the rise **60*e*** in the line designated "Writing Pulse" in FIGURE 17.

Another result of the closing of the cyclically operated switch 560 will be the flow of current from its fixed contact 559 through the lead 586 to the coil of the relay 587, closing the contacts of that relay so that current will flow therethrough from one side of 60 volt D.C. line by a lead 589, the contacts of relay 587, lead 591 through the magnet coil 118 which actuates the trip of the one revolution clutch 116. In FIGURE 17, the closing of the contacts of relay 587 is indicated by the rise **587*e* in the line designating the action of that relay. The energization of the trip actuating magnet 118 is shown in FIGURE 17 by the rise 118*e* in the line indicating the action of that magnet. It will be observed that energization of magnet 118 (rise 118*e*) begins only a few milliseconds after the writing pulse begins as indicated by rise 60*e*. However, because of the lag of the operation of the mechanical pawl 150, drum 38** actually will not begin its single-step rotation until about several milliseconds after the writing pulse terminates as discussed below.

With the foregoing operations in progress, and when the cam shaft 563 has rotated approximately 60°, the rise in cam 565 will come opposite the movable contact 567 of writing pulse cut-off switch 566, causing current to flow through the coil of writing pulse cut-off relay 579. This will cause the movable contact 580 through which the writing pulse has been flowing to be opened. Referring to FIGURE 17, the operation of cut-off switch 566 is indicated by the rise 566e in the line designated "Writing Pulse Cut-off Switch 566." The opening of the contact 578 of cut-off relay 579 is designated by the solid line rise 579e in the line designated "Contacts of Writing Pulse Cut-off Relay 579." Because the opening of the contact 578 of this relay breaks the writing circuit, the end of the writing pulse occurs at the same instant, being indicated by the solid line drop 60d in the line designated "Writing Pulse." It will be observed that the writing pulse has lasted about ten milliseconds, shaft 563 has rotated about 60° of its cycle and drum 38 has not yet started to move. Hence, the writing pulse or signal has been applied to the track cell while the drum is stationary.

The energization of cut-off relay 579 to terminate the writing pulse will also set up a holding circuit through the contact 582 of that relay, this circuit extending from conductor 555a by lead 564, through switch 560, thence by lead 570, contact 582, fixed contact 583, and by leads 584 and 585 through the coil of relay 579 to conductor 555.

A few milliseconds after the writing pulse has terminated, pawl 150 will actually transmit the motion of shaft 120 to worm 166 and drum 38, the rotation of the drum being indicated by the rise 38e in the line of FIGURE 17 entitled "Movement of Drum 38." The start of this drum movement occurs at about 70° after the start of the cycle of shaft 563.

As is indicated in FIGURE 17 by the drop 566d in the line indicating the action of writing pulse cut-off switch 566, when shaft 563 has rotated about 190°, it will permit switch 566 to open. However, the holding circuit through the coil of cut-off relay 579 will prevent that relay from being de-energized to thereby reclose the contact 578 of cut-off relay 579 at this moment. Hence, writing cannot resume even though the writing pulse starting relay 572 is still energized and its contact 576 closed.

When shaft 563 has rotated approximately 200°, cam 562 will permit switch 560 to open as indicated by the drop 560d in the line of FIGURE 17 indicating the action of that switch. The opening of switch 560 will de-energize each of the relays 550 and 572 as indicated by the drop 550d in the line indicating the action of those relays. A few milliseconds later, the tape sensing device contacts 556 will be opened by the action of cams as described in said Tholstrup patent. The opening of the contacts 556 is indicated by the drop 557d in the line of FIGURE 17 designated "Tape Sensing Device 557." The punched tape may now move forward as described in the Tholstrup patent to bring its next punched hole position into alignment with the sensing devices.

The opening of switch 560 will also break the holding circuit through the coil of cut-off relay 579 as indicated by the solid line drop 579d in the line indicating the action of that relay. However, the fact that relays 572 and 550 open about a millisecond ahead of relay 579, which latter has greater inertia, will prevent any resumption of the writing pulse.

As is indicated in FIGURE 17 by the drop 587d in the line indicating the action of relay 587, that relay will open a few milliseconds after the circuit therethrough is broken by the opening of switch 560. The energization of trip actuating magnet 118 will immediately terminate as indicated by the drop 118d in the line indicating the action of the magnet. However, as is illustrated by the continuing rise 38e in the line associated with the legend "Movement of Drum 38," the drum will still be moving forward because of the rotation of worm 166 resulting from the continuing single rotation of shaft 120 through clutch 116. When shaft 122 completes the single rotation transmitted thereto through clutch 116, the movement of drum 38 will stop as indicated by the drop 38d. As shown in FIGURE 17, this will occur at about 325° in the rotation of shaft 563 and about 110 milliseconds after the cycle started.

*Magnet Controlling Circuits—Recording Operation—FIGURE 16*

FIGURE 16 shows a modified form of writing circuit which requires only a single cylically operated switch 560 as opposed to the provision of two such switches in FIGURE 15. Cam 562 of switch 560 has a movable contact 561 bearing upon it, the movable contact being connected to the source of current 555a by lead 564. The fixed contact 559 of switch 560 is connected by a lead 558 to the tape sensing devices 557 as has been described in connection with FIGURE 15 and lead 586 connects fixed contact 559 to the driving pulse controlling relay 587. A third lead 570a extends from fixed contact 559 to the coil of a relay 572a. Relay 572a includes a fixed contact 574a connected by a lead 575 to one side of the source of recording voltage. A movable contact 576a is normally out of engagement with contact 574a and is connected by a lead 577a to the movable contact 578a of a second relay 579a. Contact 578a is normally in engagement with the fixed contact 580a of relay 579a and is connected by a lead 581 to the contacts of the senser operated relays 550. A second fixed contact 595 included in relay 572a is connected to lead 570a and has a movable contact 596 associated therewith which is connected by a lead 597 to one end of the coil of relay 579a, the other end of the coil being connected to a conductor 555.

In the operation of the device of FIGURE 16, after a sensing pin has moved through a hole in the tape and the contacts 556 and 556a engage, the cyclically operated switch 560 will close in the same timed relation as is indicated at 560e in FIGURE 17 and in connection with the circuit of FIGURE 15. Closing of switch 560 will energize the coils of such senser operated relay 550 as have tape holes opposite their senser devices 557. In addition, the relays 572a and 579a will be energized, and the closing of the contact 576a of relay 572a will cause a writing voltage to flow by lead 575, contacts 574a and 576a, lead 577a and the contacts 578a and 580a and by lead 581 to such senser operated relay contacts 551 and 549 as may be engaged, and thence to the corresponding recording magnet 60. Referring to FIGURE 17, the closing of any relays 550 and relay 572a will be at the same instant as is indicated in that figure with respect to the relays 550 and 572 of the FIGURE 15 arrangement.

The instant that the recording pulse thus starts will be the same as is indicated in FIGURE 17 opposite the legend "Recording Pulse" by the rise 60e. It will be observed that this corresponds in time with the closing of the relay 572a indicated by the rise 550e. The closing of the other movable contact 596 of relay 572a will energize the coil of 579a to move its movable contact 578a away from the fixed contact 580a to thereby break the circuit for the recording pulse. This opening of relay 579 will be at the instant indicated by the dotted line rise 579f in FIGURE 17 opposite the legend "Contacts of Recording Pulse Cut-off Relay 579." The dotted line drop 60f in the line of FIGURE 17 opposite the legend "Recording Pulse" indicates the moment at which the recording pulse terminates by the opening of contacts of relay 579a. It will be observed that the termination of the recording pulse corresponds with the closing of the contacts of relay 579a indicated by the dotted line rise 579f.

The relay 587 and clutch trip actuating magnet 118 will respectively be closed and energized at the instant indicated in FIGURE 17 with respect to the FIGURE 15 system. All of the elements used in the FIGURE 16 system except the relay 579*a* resume normal position at the same instant as is shown in FIGURE 17 for the FIGURE 16 elements. The contacts of relay 579*a* will remain open slightly longer than the contacts of the relay 579 of FIGURE 16, the reclosing of relay 579*a* contacts being indicated in FIGURE 17 opposite the legend "Contacts of Recording Pulse Cut-off Relay 579" by the dotted line drop 579*g*. The opening of this relay will result from the reopening of the cyclically operated switch 560.

It will be observed that the system of FIGURE 16 results in a shorter recording pulse, viz., one of about two milliseconds. Therefore, such pulse will end well before drum 38 begins its rotation under the action of the pawl 150 and the one revolution clutch 116.

It will be noted that the shaft 563 synchronizes movement of the drama 38 with the operation of the circuits of FIGURES 16 and 17.

*Magnet Controlling Circuits—Reading and Re-recording*

In some instances, it is desirable to read data signals carried by drum 38, erase them, and then re-record them upon another part of the drum, perhaps with some alteration of the signals. FIGURE 18 diagrammatically shows circuits involved in this action, the circuit being duplicated for each of the tracks or tapes involved. Tracks which are to be used for timing will not be included in the recording and erasing circuits of FIGURE 18 because timing signals will not be either erased or rewritten.

As drum 38 rotates with the circuit of FIGURE 18 in effect, a magnetized area or cell of the drum will pass beneath the reading magnet or head 62 and a signal having the characteristics of those shown in FIGURE 19 will be generated in the magnet. This signal will be differentiated by the elements 656 and 657 and the resultant signal (one of a number such as shown in FIGURE 20) will be fed to a two-stage amplifier 658. The positive output pulse from amplifier 658 will be fed to the suppressor grid 659 of gating tube 660. Simultaneously with the appearance of the signal at reading magnet 62, a timing signal carried on a timing track of the drum as described in said Cohen et al. application will pass beneath reading magnet 661 associated with that timing track. The signal thereby generated in head 661 is applied to an electrical circuit which in turn produces a positive timing pulse at the control grid 662 of gating tube 660 at the same time the pulse from the reading head 62 appears on grid 659. Tube 660 is normally biased to current cut-off but the simultaneous appearance of the positive pulse on grids 659 and 662 produces a negative output pulse. This negative output pulse initiates the action of a one-shot multivibrator 663, the period of operation of the multivibrator being determined largely by the circuit elements 664 and 665. The output of cathode follower 666 driven by a positive pulse from the one-shot multivibrator 663 constitutes the record of the signals being read from the track on drum 38. A representative series of output signals of cathode follower 666 is shown in FIGURE 21. It will be observed that the circuit just described comprises a means for obtaining data from a track and that the output of tube 666 can be used to operate other apparatus in accordance with data on the drum.

If the data is to be re-recorded on the same track of the drum, a negative voltage pulse, obtained at the cathode of one-shot multivibrator 663, is amplified and inverted by tube 667. The resultant output, applied to rewriting amplifier 668, produces a current through high speed re-recording magnet 58 and results in the magnetization of the drum cell then opposite magnet 58. Because the operation of the circuits described above is very nearly instantaneous, as well as because drum 38 is being rotated at high speed of the order of 220 r.p.m. by motor 36, the signal received from the drum by a reading magnet 62 will be rewritten by re-recording head 58 at practically the same instant. However, the distance between magnet 62 and magnet 58 with relation to the speed of rotation of drum 38 by motor 36 must be carefully maintained by present adjustments to keep the re-recorded signals aligned with the timing signals present upon the timing track associated with timing head 661. The signals which have been brought under reading magnet 62 for re-recording by magnet 58 will be erased by the erasing (and slow speed recording) magnet 60 and before they reach the head 58. Thus, during the re-recording operation, no signals will exist on the track between the magnets 60 and 58. Insofar as the operation just described is concerned, the maximum length of a track or tape available for recording information is equal to the circumference of the drum 38 minus the short distance between the magnets 62 and 58 indicated in FIGURES 1 and 18.

It will be understood that high speed recording other than the re-recording described above can also be performed upon drum 38, i.e., without simply transferring data from one point upon the drum to another point.

It will be observed that the magnets or corresponding elements used with the data storage element are all data or signal transmitting elements, regardless of whether they erase, alter, read, or record data or signals. Also, it will be clear that the data to be transmitted may be represented by signals which are of a form other than magnetic pulses.

The terminology used in the specification is for the purpose of description and not of limitation, the scope of the invention being defined in the claims.

I claim:

1. In combination, a base, a data receiving paramagnetic element movable with respect to said base, data transmitting means including a magnet positioned adjacent the path of movement of said element, selectively operable drive mechanism to move said element either at high speed or at low speed to a predetermined extent, means operable upon movement of the element to said extent to cause the low speed movement to be step by step in steps of uniform length to a further extent, and means operable upon movement of the element to said further extent to stop operation of said drive mechanism.

2. Apparatus for transmitting data with respect to a paramagnetic element comprising cyclically operated tape feeding means, a tape sensing device, a data signal voltage source, a magnet adjacent said paramagnetic element, means to move said element, a driving voltage source, and cyclically operated switch means synchronized with said tape feeding means to momentarily connect said magnet with said signal voltage source through said tape sensing device and to connect said element moving means to said driving voltage source.

3. Apparatus of the character described in claim 2 wherein the means to drive the paramagnetic element includes a connection between the element and a shaft, a continuously driven shaft, and means operable by said driving voltage source to connect said shafts.

4. Apparatus of the character described in claim 2 wherein the paramagnetic element includes a worm wheel and the means to move the paramagnetic element includes a continuously driven shaft, a pawl-carrying shaft, a worm shaft engaging the worm wheel and having a ratchet wheel fixed thereto and associated with the pawl of said pawl-carrying shaft, and a periodic engagement clutch operable by said driving voltage source to connect said continuously driven shaft and said pawl-carrying shaft.

5. Apparatus for transmitting data with respect to a paramagnetic element comprising a cyclically operated tape feeding means, a tape sensing device, a magnet adjacent said paramagnetic element, a first relay including normally open contacts, a second relay including normally closed contacts in series with one contact of said first relay, said tape sensing device and said magnet, a data signal voltage source connected to the other contact of said first relay, means to drive said paramagnetic element, and means operated in synchronism with said tape feeding means to operate said paramagnetic element driving means and energize said first relay to close its contacts to thereby connect the data signal voltage source to said magnet and then energize said second relay to open its contacts to break the data signal connection.

6. Apparatus of the character described in claim 5 wherein said second relay includes a second pair of normally opened contacts arranged to close a holding circuit through its coil when it is energized and said means operated in synchronism with the tape feeding means is arranged to open said holding circuit.

7. Apparatus of the character described in claim 5 wherein said means operated in synchronism with the tape feeding means comprises a single cyclically operated switch and the coil of said first relay is energized prior to the coil of said second relay.

8. Apparatus of the character described in claim 5 wherein said means operated in synchronism with the tape feeding means comprises two cyclically operated switches to respectively operate said relays.

9. In a data storage apparatus, a base, a data receiving member movable with respect to said base, data transmitting means associated with said member, a source of power, means operable by said source to drive said member including a first connection by which said member may be driven at uniform speed and a second connection whereby said member may be driven step by step in steps of uniform length, and a circuit for controlling said driving means including a master relay, selectively operable means to actuate said master relay, a second relay to connect said driving means to said source of power, and a third relay to render said connections alternately effective.

10. A data storage apparatus of the character described in claim 9 wherein said driving means includes a drive transmitting element to engage said data receiving member, said element being movable with respect to said base and said member, means to control movement of said element with respect to said member, and means to operate said movement controlling means comprising fourth and fifth relays having respective contacts electrically interlocked, said pair of relays being subordinate to said master relay and respectively controlling operation of said movement controlling means to move said drive transmitting element toward and away from said data receiving member.

11. A data storage apparatus of the character described in claim 10 including means operated by the position of said drive transmitting element relative to said data receiving member to control operation of said third, fourth, and fifth relays.

12. A data storage apparatus of the character described in claim 11 including a second driving means for said drive transmitting element operable when the latter is closely engaged with said data receiving member.

13. In combination, a base, a data receiving element movable with respect to said base, a circuit including data transmitting means carried by said base adjacent the path of movement of said element, means to move said element uniformly at relatively high speed, means to move said element uniformly at relatively low speed and then step by step in steps of uniform length, and including means to cause said step by step driving means to become effective when said element has reached a predetermined position with respect to said data transmitting means.

14. In combination, a base, a data receiving element movable with respect to said base, a circuit including data transmitting means carried by said base adjacent the path of movement of said element, means to move said element uniformly at relatively high speed, means to move said element uniformly at relatively low speed and then step by step in steps of uniform length, and wherein the data receiving element is a drum provided with a paramagnetic periphery and the data transmitting means comprises a magnet adjacent the drum periphery, and including means to cause said step by step driving means to become effective when said drum has reached a predetermined position with respect to said magnet.

References Cited in the file of this patent

UNITED STATES PATENTS

| | | |
|---|---|---|
| 2,213,631 | Heller et al. | Sept. 3, 1940 |
| 2,354,950 | Feldhausen | Aug. 1, 1944 |
| 2,359,617 | Bryce | Oct. 3, 1944 |
| 2,416,445 | Jensen | Feb. 25, 1947 |
| 2,507,756 | Boylan | May 16, 1950 |
| 2,575,442 | Cooley | Nov. 20, 1951 |
| 2,614,169 | Cohen et al. | Oct. 14, 1952 |
| 2,617,705 | Combs et al. | Nov. 11, 1952 |
| 2,648,589 | Hickman | Aug. 11, 1953 |
| 2,720,953 | Dayton | Oct. 18, 1955 |
| 2,726,747 | Kreidler | Dec. 13, 1955 |
| 2,814,676 | House | Nov. 26, 1957 |
| 2,853,357 | Barber | Sept. 23, 1958 |

OTHER REFERENCES

J. M. Combs: "Storage of Numbers on Magnetic Tape"; pp. 201–209, Proceedings of the National Electronics Conference held at Chicago, Ill., Nov. 3–5, 1947; published Mar. 17, 1948. Rogers Printing Co., Chicago and Dixon, Ill.